(12) United States Patent
Sugiyama et al.

(10) Patent No.: US 9,389,421 B2
(45) Date of Patent: Jul. 12, 2016

(54) DISPLAY DEVICE AND DISPLAY SYSTEM

(71) Applicant: PANASONIC CORPORATION, Osaka (JP)

(72) Inventors: Keiji Sugiyama, Kyoto (JP); Kakuya Yamamoto, Hyogo (JP); Kenichi Kasazumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 234 days.

(21) Appl. No.: 13/995,354

(22) PCT Filed: Oct. 16, 2012

(86) PCT No.: PCT/JP2012/006604
§ 371 (c)(1),
(2) Date: Jun. 18, 2013

(87) PCT Pub. No.: WO2013/057923
PCT Pub. Date: Apr. 25, 2013

(65) Prior Publication Data
US 2014/0049451 A1    Feb. 20, 2014

(30) Foreign Application Priority Data
Oct. 20, 2011   (JP) .................. 2011-230496

(51) Int. Cl.
*G02B 27/01*   (2006.01)
*G03H 1/08*   (2006.01)
(Continued)

(52) U.S. Cl.
CPC ............ *G02B 27/0172* (2013.01); *G02B 27/01* (2013.01); *G02B 27/0103* (2013.01);
(Continued)

(58) Field of Classification Search
None
See application file for complete search history.

(56) References Cited

U.S. PATENT DOCUMENTS

2006/0250671 A1   11/2006   Schwerdtner et al.
2009/0141501 A1   6/2009   Mukawa
(Continued)

FOREIGN PATENT DOCUMENTS

CN   101446684   6/2009
CN   101673161   3/2010
(Continued)

OTHER PUBLICATIONS

International Search Report issued Jan. 22, 2013 in International (PCT) Application No. PCT/JP2012/006604.
(Continued)

*Primary Examiner* — David D Davis
(74) *Attorney, Agent, or Firm* — Wenderoth, Lind & Ponack, L.L.P.

(57) ABSTRACT

A display device includes a light source which outputs laser light, an illumination optical system which emits the laser light as illumination light, a spatial modulation element which diffracts the illumination light by displaying a diffraction pattern, a diffraction pattern acquiring unit which acquires a basic diffraction pattern generated based on an image, and a diffraction pattern process unit which uses the basic diffraction pattern and a correction diffraction pattern for correcting the basic diffraction pattern to generate, as the diffraction pattern to be displayed on the spatial modulation element, a combined diffraction pattern obtained by correcting the basic diffraction pattern by the correction diffraction pattern. The spatial modulation element displays diffracted light, which is diffracted by displaying the combined diffraction pattern, to a user as a fictive image.

15 Claims, 24 Drawing Sheets

(51) Int. Cl.
*G03H 1/22* (2006.01)
*G09G 3/00* (2006.01)
*G03H 1/26* (2006.01)

(52) U.S. Cl.
CPC ............ *G03H1/0808* (2013.01); *G03H 1/2294* (2013.01); *G09G 3/003* (2013.01); *G02B 2027/011* (2013.01); *G02B 2027/014* (2013.01); *G03H 1/2286* (2013.01); *G03H 2001/0825* (2013.01); *G03H 2001/2271* (2013.01); *G03H 2001/2297* (2013.01); *G03H 2001/261* (2013.01); *G03H 2223/23* (2013.01); *G03H 2225/60* (2013.01); *G03H 2226/02* (2013.01); *G03H 2227/02* (2013.01); *G03H 2270/55* (2013.01)

(56) References Cited

U.S. PATENT DOCUMENTS

| | | |
|---|---|---|
| 2009/0225380 A1 | 9/2009 | Schwerdtner et al. |
| 2010/0097580 A1* | 4/2010 | Yamamoto ............ G02B 26/101 353/69 |
| 2010/0157433 A1 | 6/2010 | Mukawa et al. |
| 2011/0032706 A1 | 2/2011 | Mukawa |
| 2011/0109948 A1 | 5/2011 | Cable |
| 2011/0164067 A1* | 7/2011 | Lewis ................ G02B 26/0841 345/690 |
| 2012/0287374 A1 | 11/2012 | Mukawa |
| 2013/0265623 A1* | 10/2013 | Sugiyama ............ G02B 27/017 359/13 |

FOREIGN PATENT DOCUMENTS

| | | |
|---|---|---|
| CN | 101750738 | 6/2010 |
| JP | 6-202575 | 7/1994 |
| JP | 8-240773 | 9/1996 |
| JP | 8-262962 | 10/1996 |
| JP | 2002-107654 | 4/2002 |
| JP | 2006-301020 | 11/2006 |
| JP | 2008-541145 | 11/2008 |
| JP | 2009-145646 | 7/2009 |
| JP | 2011-507022 | 3/2011 |

OTHER PUBLICATIONS

Tomoyoshi Shimobaba et al., "Fast generation of Fresnel computer-generated-hologram by use of GPU cluster and wavefront-recording method, and the estimation of scalability", Journal of the Institute of Image Information and Television Engineers, ITE Technical Report vol. 33, No. 35, pp. 21-24, Sep. 4, 2009.

Office Action issued Jan. 20, 2016 in Chinese Application No. 201280004218.3, with English translation of Search Report.

* cited by examiner

FIG. 10

| CONNECTION DESTINATION | COMMUNICATION ADDRESS | COMMUNICATION MEANS |
|---|---|---|
| DISPLAY TERMINAL 905 | 10.xxx.xxx.xxx | 802.11n |
| DISPLAY TERMINAL 906 | 132.xxx.xxx.xxx | LAN |
| DISPLAY TERMINAL 907 | ... | ... |

1801

1901

1902

401

402

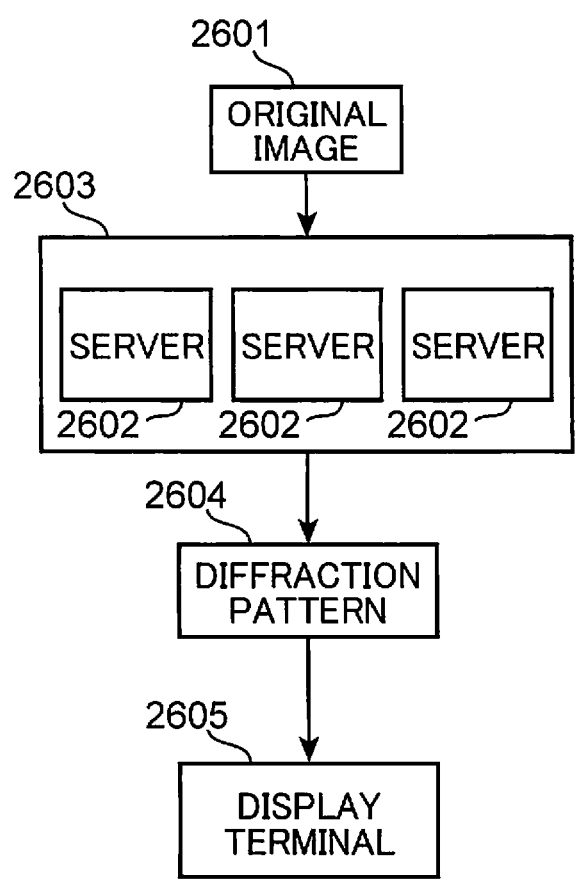

DISPLAY DEVICE AND DISPLAY SYSTEM

TECHNICAL FIELD

The present invention relates to a display device and a display system which display information by diffracting laser light using a diffraction pattern by a computer-generated hologram and each of which is a head-mounted type for example.

BACKGROUND ART

A head-mounted display (hereinafter, called as "HMD") is a device which displays information to a user in a state that the user wears the HMD on the user's head. Generally, the HMD is desired to be compact in size and light in weight in terms of wearability, but on the other hand, is desired to be large in screen size and high in image quality in terms of display performance. Conventionally, the HMD employs a system, in which an image displayed on a compact liquid crystal panel is optically enlarged by a convex lens or a free-form surface prism, whereby an enlarged fictive image is displayed to the user (see e.g. patent literature 1). In the present specification, the aforementioned system for enlarging an image by a prism or the like is referred to as "optical enlargement system".

Further, in a display device using a computer-generated hologram (hereinafter, called as "CGH"), a diffraction pattern obtained by using an image to be displayed as input data with use of a computer is displayed on a phase modulation type liquid crystal panel, causes laser light to irradiate the liquid crystal panel to be diffracted, whereby a wavefront of display light from a fictive image position is reproduced and the fictive image is displayed to the user (see e.g. patent literature 2). The CGH method has a feature that a three-dimensional stereoscopic image can be displayed in front of or behind the liquid crystal panel. There is also proposed a conventional example, in which a three-dimensional stereoscopic image is displayed to a user by a diffraction pattern, although this system does not employ the CGH method (see e.g. patent literature 3).

FIGS. 26A and 26B are diagrams showing an example of a diffraction pattern to be displayed on a liquid crystal panel by a CGH method, and an example of an image to be visibly recognized by the user. FIG. 26A shows an example of an original image 401. FIG. 26B shows an example of a diffraction pattern 402 generated from the original image 401. The diffraction pattern 402 is displayed on a phase modulation type liquid crystal panel or the like, the liquid crystal panel is irradiated by laser light, and the laser light is diffracted, whereby the user can visibly recognize the original image 401, based on which the diffraction pattern 402 is generated.

Generally, a generation method by a point filling method or a Fourier transform is used to compute a diffraction pattern from an original image. In the following, a computation method employing a point filling method is exemplified as a method for generating a diffraction pattern. In the point filling method, an original image (object) is defined as a group of point light sources, and a diffraction pattern is computed from the phase at which light from each of the point light sources overlap at each point on a liquid crystal panel.

FIG. 27 is a diagram showing an example of a positional relationship, in generating the diffraction pattern, between an original image 501 and a liquid crystal panel 502 on which a diffraction pattern is displayed. Each point (each pixel) on the original image 501 is defined as a point light source as described above for generating a diffraction pattern to be displayed on the liquid crystal panel 502 by a point filling method. In the case where the point "i" on the original image 501 has an amplitude "$\alpha_i$", and a phase "$\phi_i$", the complex amplitude, of light from the point "i", at the point "u" on the liquid crystal panel 502 is expressed by the formula (1).

Further, "$r_i$" in the formula (1) denotes a distance between the point "i" and the point "u", and is computed by the formula (2), assuming that the center of the liquid crystal panel 502 is the origin, (xi, yi, zi) denotes a coordinate of the point "i", and ($\xi$, $\eta$) denotes a coordinate of the point "u".

Further, k=$2\pi/\lambda$, where k in the formula (1) denotes a wavenumber, and $\lambda$ denotes a wavelength of light from the point "i". The complex amplitude, of light from the point "i", at the point "u" is obtained by the computation based on the formula (1). Accordingly, it is possible to obtain the value of the complex amplitude at the point "u" on the liquid crystal panel 502 by performing the aforementioned computation process with respect to each of the points on the original image 501 and by summing up the computation results. The formula (3) is a computation formula representing a complex amplitude at the point "u".

By the point filling method, a diffraction pattern is generated by performing the computation as expressed by the formula (3) with respect to each of the points on the liquid crystal panel 502. To simplify the description, in this example, a change in the phase by reference light and the like are not exemplified.

[Formula 1]
$$u_i(\xi, \eta) = \frac{\alpha_i}{r_i}\exp\{-j(kr_i + \phi_i)\} \quad (1)$$

[Formula 2]
$$r_i = \sqrt{(\xi - x_i)^2 + (\eta - y_i)^2 + z_i^2} \quad (2)$$

[Formula 3]
$$u(\xi, \eta) = \sum_{i=1}^{N} u_i(\xi, \eta) \quad (3)$$

However, in the case where a diffraction pattern is computed with use of a point filling method, as shown in the computation formulas (1) through (3), an increase in the pixel number of the original image 501 and an increase in the pixel number of the liquid crystal panel 502 (the pixel number of a diffraction pattern) results in an increase in the required number of times of computation, which increases the computation cost. Assuming that the pixel number of a diffraction pattern and the pixel number of an original image are both expressed by N×N (where N is a positive integer), the order of computation relating to a point filling method is the fourth power of N. Thus, as the pixel number increases, the computation amount required for computing a diffraction pattern increases.

Generally, as compared with a terminal device for use in a server or the like, the computing capacity of a mobile terminal such as an HMD is low. Accordingly, if a process requiring a large computation amount such as computing a diffraction pattern by a point filling method is performed by a mobile terminal such as an HMD, a long period of time may be necessary for generating a diffraction pattern. Further, performing a process requiring a large computation amount means considerably consuming a battery of the mobile terminal, which reduces a period of time usable for the mobile terminal.

There is proposed a method, which is an improvement of the point filling method, for computing a diffraction pattern with use of a method of applying an inverse Fourier transform to an image to be displayed to the user (see e.g. patent literature 4). However, as the pixel number of an original image or a diffraction pattern increases, the load of the computation amount of Fourier transform becomes heavy for a mobile terminal such as an HMD, which makes it difficult to generate a diffraction pattern at a high speed.

There is proposed a computation method with use of not a mobile terminal but a plurality of terminal devices having a high computing capacity to compute a diffraction pattern requiring a large amount of computation at a high speed (see e.g. non-patent literature 1). FIG. 28 is a diagram showing an example, in which a diffraction pattern is computed with use of servers having a high processability, and display is performed with use of an HMD. In the example shown in FIG. 28, servers 2602 perform computing for generating a diffraction pattern 2604 from an original image 2601. As expressed by the formulas (1) through (3), computing a diffraction pattern by a point filling method makes it easy to perform parallel processing. Accordingly, in the example shown in FIG. 28, a computing cloud 2603 is configured to allow the servers 2602 to perform parallel processing. Use of the computing cloud 2603 by the servers 2602 makes it possible to compute the diffraction pattern 2504 at a higher speed. Transmitting the computed diffraction pattern 2604 to a display terminal 2605 such as an HMD, and displaying the diffraction pattern 2604 on the display terminal 2605 makes it possible to display the diffraction pattern 2604 at a high speed, even in the case where the computing capacity of the display terminal 2605 is low.

CITATION LIST

Patent Literature

Patent literature 1: JP Hei 8-240773A
Patent literature 2: JP 2008-541145A
Patent literature 3: JP Hei 6-202575A
Patent literature 4: JP 2011-507022A Non-Patent Literature Non-patent literature 1: Fast generation of Fresnel computer-generated-hologram by use of GPU cluster and wavefront-recording method, and the estimation of scalability by the Journal of the Institute of Image Information and Television Engineers, 33 (35), pp. 21-24, 2009-09-04

SUMMARY OF INVENTION

As shown in FIG. 28, in the case where a computer terminal for computing a diffraction pattern, and a display terminal for displaying the diffraction pattern are separately provided, it is conceivable that diffraction patterns displayable on a plurality of display terminals are computed with use of one computer terminal. In this case, however, the computation load may be excessively increased, if a plurality of diffraction patterns are simultaneously computed, even with use of a computer terminal having a high computing capacity. On the other hand, it is desirable to display diffraction patterns suitable for individual display terminals on the display terminals.

In view of the above, an object of the invention is to provide a display device that enables to display diffraction patterns suitable for individual devices. Another object of the invention is to provide a display system that enables to display diffraction patterns suitable for display terminals, while suppressing an increase in the computation load on a computer terminal.

A display device according to an aspect of the invention includes: a light source which outputs laser light; an illumination optical system which emits the laser light as illumination light; a spatial modulation element which diffracts the illumination light by displaying a diffraction pattern; a diffraction pattern acquiring unit which acquires a basic diffraction pattern generated based on an image; and a diffraction pattern process unit which uses the basic diffraction pattern and a correction diffraction pattern for correcting the basic diffraction pattern to generate, as the diffraction pattern to be displayed on the spatial modulation element, a combined diffraction pattern obtained by correcting the basic diffraction pattern by the correction diffraction pattern, wherein the spatial modulation element displays diffracted light, which is diffracted by displaying the combined diffraction pattern, to a user as a fictive image.

According to the invention, it is possible to provide a display device capable of appropriately displaying a fictive image to a user by displaying, on a spatial modulation element, a combined diffraction pattern suitable for the device.

BRIEF DESCRIPTION OF DRAWINGS

FIG. 10 is a diagram showing an example of a table to be held by a display terminal management unit according to the first embodiment;

FIG. 28 is a diagram showing an example of a configuration of a CGH display system utilizing servers.

DESCRIPTION OF EMBODIMENTS

Figure 1:
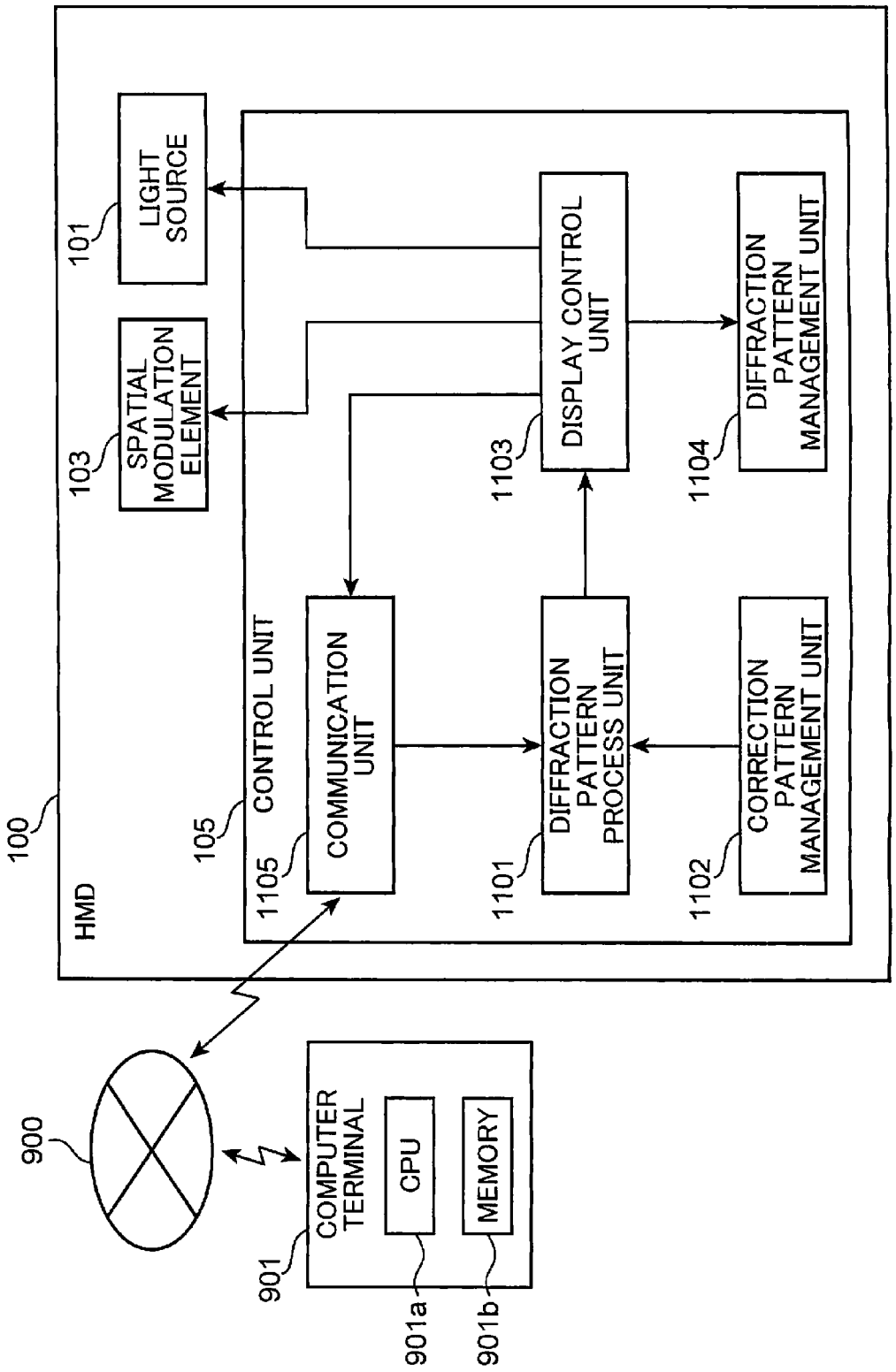
FIG. 1 is a diagram showing an example of a configuration of a display system according to a first embodiment.

In the following, embodiments of the invention will be described referring to the drawings. The following embodiments are a mere example embodying the invention, and do not limit the technical range of the invention.

(Finding of Inventors)

At first, the finding of the inventors is described. As shown in FIG. 28, in the case where the computing cloud 2603 is employed as a computer terminal of the diffraction pattern 2604, it is conceivable that diffraction patterns displayable on a plurality of display terminals are generated by the computer terminal, and that the generated diffraction patterns are transmitted to the respective display terminals via a network. However, in a CGH display device for reproducing a display image (fictive image) by a diffraction pattern, it is necessary to generate a diffraction pattern, taking into consideration of the user's eyesight.

Figure 4:
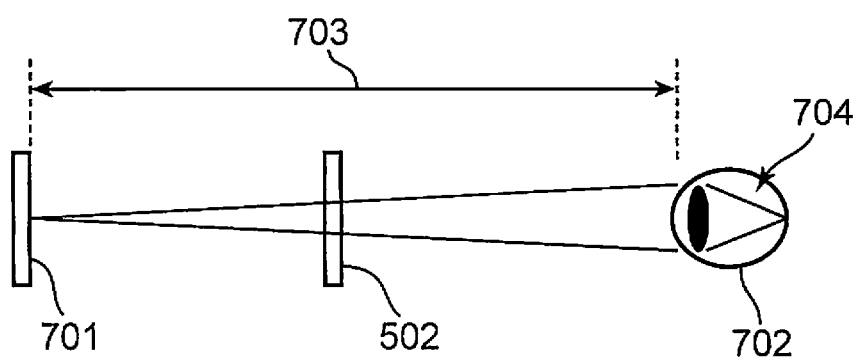
FIG. 4 is a diagram describing an example showing an influence of the user's eyesight.
Figure 5:
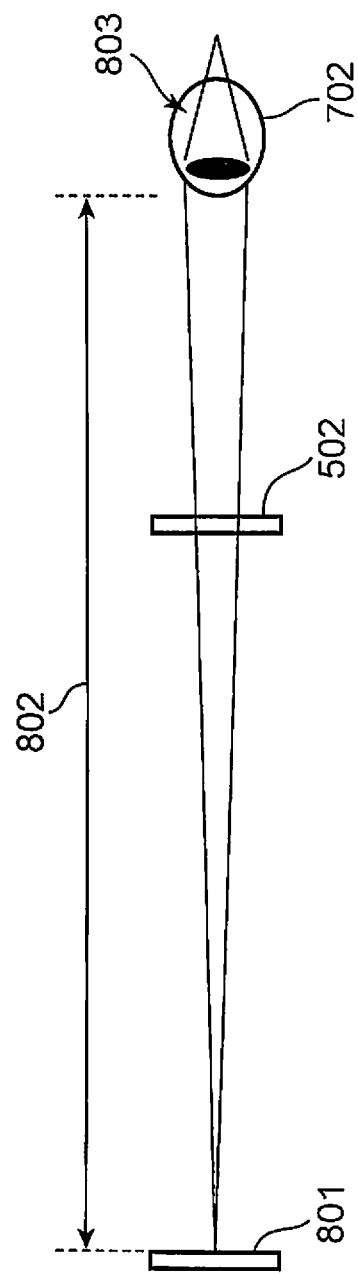
FIG. 5 is a diagram describing an example showing an influence of the user's eyesight.

FIG. 4 and FIG. 5 are diagrams describing an example showing an influence of the user's eyesight. FIG. 4 shows an example, in which a reproduced image 701 is displayed at a position (with a viewing distance 703 from the user) close to the liquid crystal panel 502. At this time, a diffraction pattern capable of displaying a fictive image at the position of the reproduced image 701 is displayed on the liquid crystal panel 502. Diffracted light 704 from this diffraction pattern enters the eye of a user 702, and forms an image on the retina of the eye of the user 702. In the example shown in FIG. 4, the diffracted light 704 is collected on the retina of the eye of the user 702. Accordingly, the user 702 can clearly see the reproduced image 701. However, in the case where the eyesight of the user 702 is poor (for instance, in the case where the user 702 is short-sighted), the user 702 cannot clearly see the reproduced image, when the distance between the user 702 and the reproduced image increases.

In the example shown in FIG. 5, a reproduced image 801 is displayed at a position (with a viewing distance 802 from the user) away from the liquid crystal panel 502. At this time, a diffraction pattern capable of displaying a fictive image at the position of the reproduced image 801 is displayed on the liquid crystal panel 502. Diffracted light 803 from this diffraction pattern enters the eye of the user 702, as with the case of the example shown in FIG. 4. However, in the example shown in FIG. 5, the user 702 is short-sighted, and cannot focus the user's eye at the position of the reproduced image 801. As a result, the diffracted light 803, which reproduces the light from the reproduced image 801, is not collected on the retina of the eye of the user 702. Consequently, the user 702 finds it difficult to accurately see the reproduced image 801 (in the case of the example shown in FIG. 5, the reproduced image 801 is seen blurred).

As shown in the example of FIG. 5, the CGH display device has a drawback that the user 702 cannot accurately see a displayed fictive image, when a diffraction pattern that does not match the eyesight of the user 702 is displayed. In view of the above, in the case where diffraction patterns corresponding to a plurality of display terminals are generated with use of one computer terminal, it is necessary to compute the diffraction patterns corresponding to the individual display terminals, on the computer terminal. This example is shown in FIG. 6.

Figure 6:
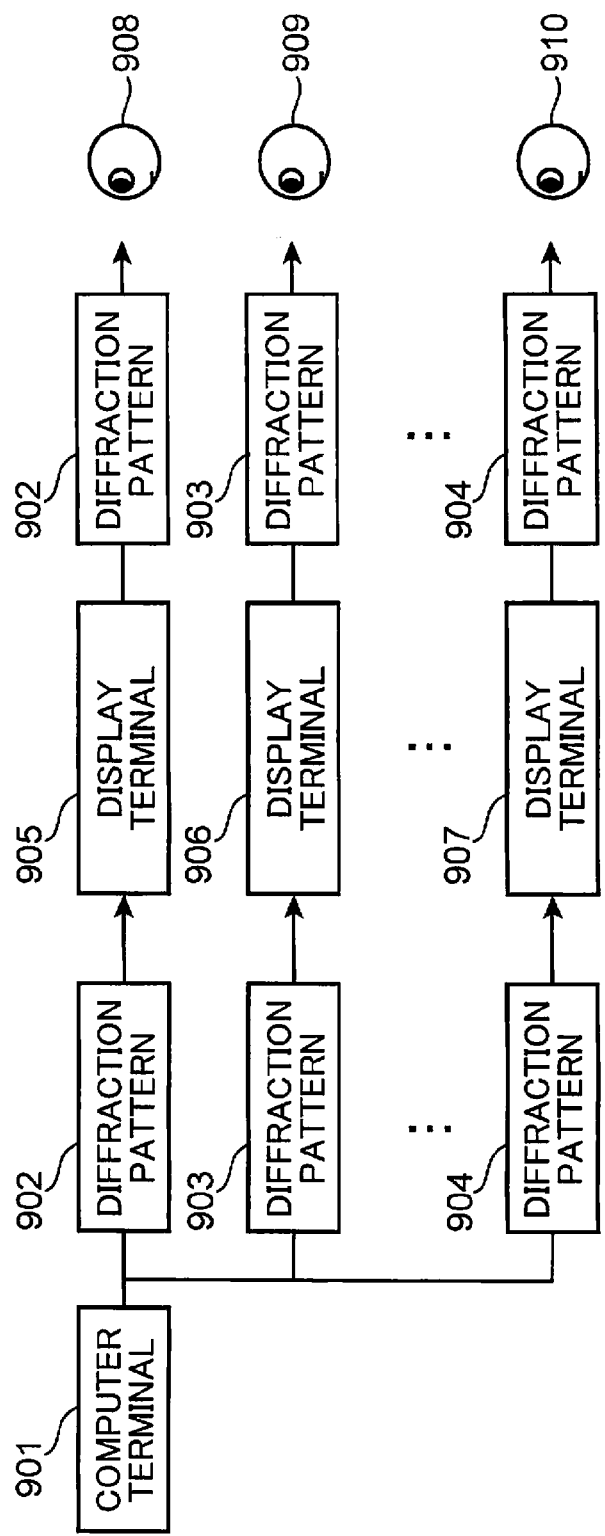
FIG. 6 is a diagram showing an example of a system, in the case where a computer terminal transmits individual diffraction patterns to a plurality of display terminals.

FIG. 6 is a diagram showing a configuration example, in which diffraction patterns corresponding to a plurality of display terminals are generated with use of one computer terminal. Referring to FIG. 6, a computer terminal 901 generates different diffraction patterns 902 through 904 for display terminals 905 through 907 respectively, and transmits the generated diffraction patterns 902 through 904 to the display terminals 905 through 907. The diffraction patterns 902 through 904 are generated from one original image, but are different diffraction patterns according to the eyesights of users 908 through 910 who respectively use the display terminals. Performing the process as described above makes it possible to display diffraction patterns corresponding to the display terminals 905 through 907 with use of the one computer terminal 901.

However, the above configuration means generating different diffraction patterns for the display terminals 905 through 907 from one original image. This severely increases the computation load on the computer terminal 901, and makes it difficult to display on a large number of display terminals. Non-patent literature 1 mentioned above does not take into consideration of the above point. In the following, embodiments taking into consideration of the above point will be described.

First Embodiment

In a first embodiment, there is described an example, in which an HMD as an example of a display terminal communicates with a computer terminal via a communication network.

Figure 7:
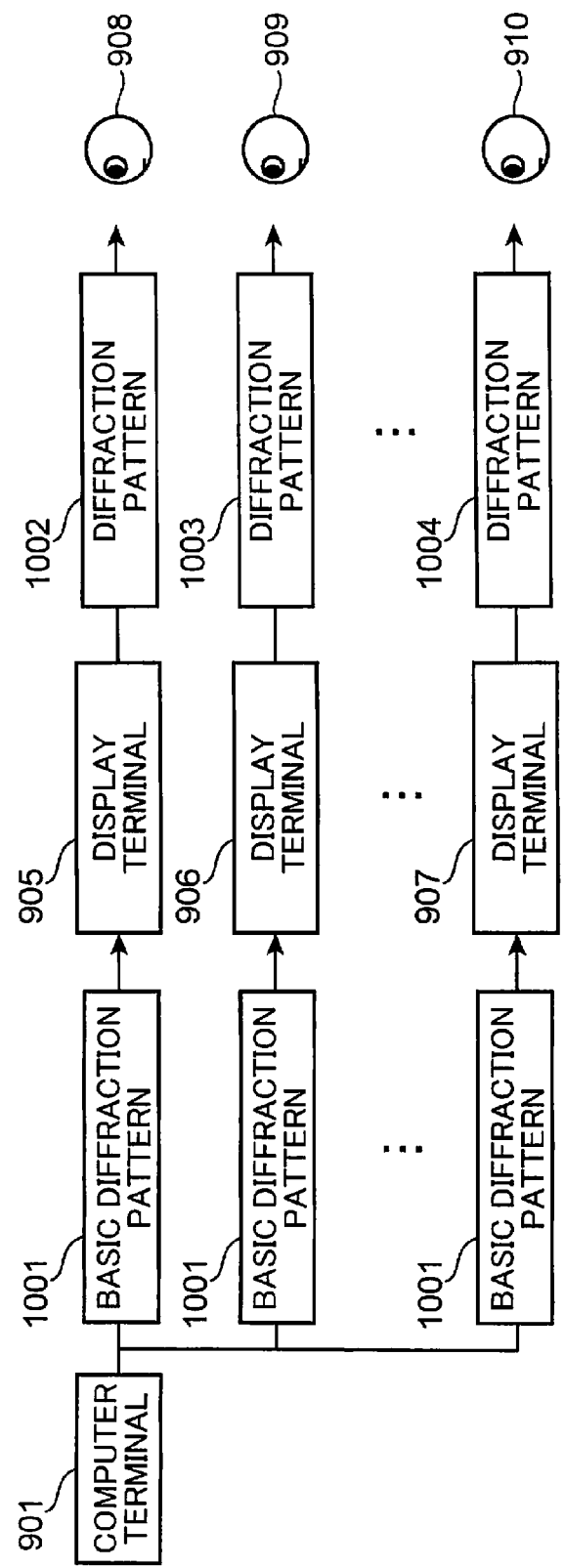
FIG. 7 is a diagram showing a relationship between a computer terminal and display terminals according to the first embodiment.

FIG. 7 is a diagram showing a relationship between a computer terminal and display terminals according to the first embodiment. In FIG. 7, like elements as those shown in FIG. 6 are designated by the same reference numerals. The computer terminal 901 generates a basic diffraction pattern 1001 from an image (for instance, the original image 401 shown in FIG. 26A) to be displayed to a user, and transmits the generated basic diffraction pattern 1001 to the display terminals 905 through 907. The display terminals 905 though 907 generate diffraction patterns 1002 through 1004 by correcting the basic diffraction pattern 1001 according to the eyesights of the respective users 908 through 910, and display fictive images to the users 908 through 910. This process will be described later in detail.

Figure 2:
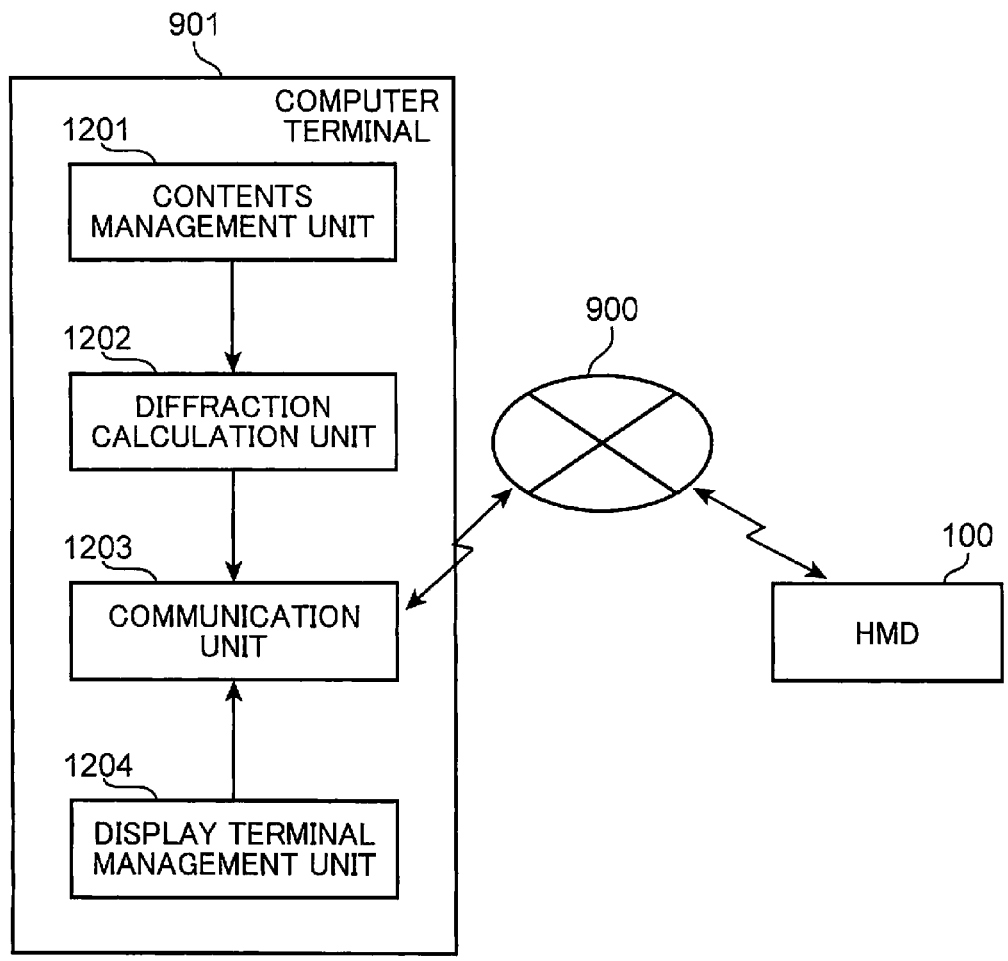
FIG. 2 is a diagram showing an example of the configuration of the display system according to the first embodiment.
Figure 3:
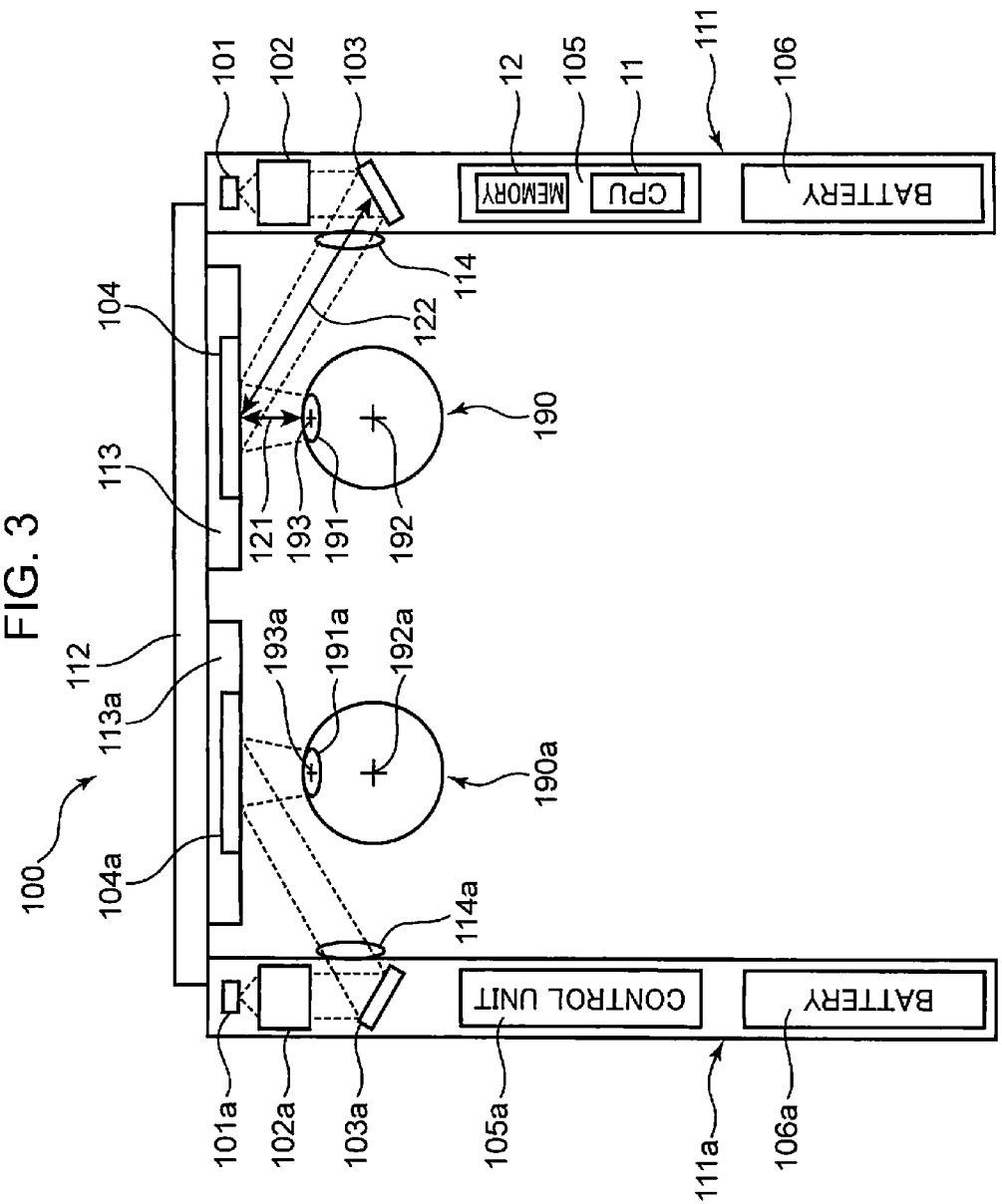
FIG. 3 is a configuration diagram of an HMD according to the first embodiment of the invention.

FIG. 1 and FIG. 2 are block diagrams of a display system including a head-mounted display device (HMD) 100 and the computer terminal 901 according to the first embodiment. FIG. 3 is a diagram schematically showing a configuration of the HMD 100 shown in FIG. 1. As shown in FIG. 3, the HMD 100 according to the first embodiment is in the form of eyeglasses. FIG. 3 is a top plan view of the HMD 100. In the first embodiment, there is described an example, in which the HMD 100 corresponds to the display terminal 905 shown in FIG. 7.

In the first embodiment, as shown in FIG. 3, a control unit 105 of the HMD 100 includes a CPU 11 and a memory 12, and controls generation of a diffraction pattern, for instance. As shown in FIG. 1, the control unit 105 has, as functional blocks of the CPU 11, a diffraction pattern process unit 1101, a correction pattern management unit 1102, a display control unit 1103, a diffraction pattern management unit 1104, and a communication unit 1105. A program is stored in the memory 12. Further, data and the like are temporarily stored in the memory 12. The CPU 11 operates as the above functional blocks by executing the program stored in the memory 12. The functions of the functional blocks shown in FIG. 1 will be described later.

In the first embodiment, as shown in FIG. 1, the computer terminal 901 is provided with a CPU 901a and a memory 901b. As shown in FIG. 2, the CPU 901a includes, as functional blocks, a contents management unit 1201, a diffraction calculation unit 1202, a communication unit 1203, and a display terminal management unit 1204. A program is stored in the memory 901b. Further, data and the like are temporarily stored in the memory 901b. The CPU 901a operates as the above functional blocks by executing the program stored in the memory 901b. The functions of the functional blocks shown in FIG. 2 will be described later.

Referring to FIG. 1 and FIG. 3, a light source 101 is a laser light source which outputs laser light. In the first embodiment, a semiconductor laser (laser diode) which outputs laser light in a green wavelength is used as the light source 101. The light source 101 may be a semiconductor laser which outputs laser light of another color such as red or blue, or may be configured to display a color image by combining the wavelengths of light of three colors of red, green, and blue, or may be configured to display a color image by driving laser light sources with time-division for outputting light of three colors as will be described later. Further, a laser other than a semiconductor laser may be used, or a semiconductor laser may be combined with a device other than the semiconductor laser. Further, combination of a semiconductor laser for outputting infrared light, and a secondary harmonic generating (SHG) element for converting infrared light into green light may be used.

An illumination optical system 102 emits illumination light, in which the wavefront shape or the intensity distribution of laser light from the light source 101 are changed. In the first embodiment, a convex lens for converting laser light of divergent light into convergent light, and a neutral density filter (ND filter) for attenuating the intensity of laser light are used as the illumination optical system 102. An element for changing the wavefront shape of illumination light may be a lens or a mirror, or an element capable of dynamically changing the parameter, as exemplified by a liquid crystal lens. Further, the illumination optical system 102 may include an optical system for changing the intensity distribution. Further, the illumination optical system 102 may include a filter for removing unwanted illumination light.

A spatial modulation element 103 diffracts illumination light from the illumination optical system 102 by displaying a diffraction pattern to enable the user to see a display image. In the first embodiment, a phase-modulation type reflective liquid crystal panel is used as the spatial modulation element 103. As far as the spatial modulation element 103 can diffract illumination light by displaying a diffraction pattern, any display element may be used. For instance, a transmissive panel may be used as the spatial modulation element 103. The above modification makes it possible to change the layout of an optical system such as arranging the light source 101 on the ear side of the eyeglasses.

A reflection mirror 104 reflects diffracted light from the spatial modulation element 103 toward an eyeball 190 of the user. In the first embodiment, a semi-transmissive Fresnel mirror is used as the reflection mirror. A semi-transmissive Fresnel mirror is produced by forming a thin metal film on a Fresnel lens by vapor deposition. The thus-produced semi-transmissive Fresnel lens is adhered to a lens portion 113 of a front portion 112 by an adhesive. Making the refractive index of the Fresnel mirror close to the refractive index of the adhesive causes transmitted light to go straight and causes not to distort an image of the outside world which is seen through the lens portion 113. The HMD may be configured such that the user directly sees the liquid crystal panel without using the reflection mirror 104. The reflection mirror 104 may be a lens type mirror, and may be implemented by a diffraction grating such as a hologram. Forming the reflection mirror 104 by a hologram makes it possible to configure a thin see-through display device having a high transmittance.

The eyeball 190 exemplifies an eyeball at an eyeball assumed position of the HMD 100. The eyeball assumed position means a position which is assumed to be an eyeball position of the user, when the user wears the HMD 100. In the first embodiment, the eyeball assumed position coincides with a pupil center 193 of a pupil 191 of the eyeball 190 when the user wears the HMD 100. Diffracted light reflected on the reflection mirror 104 forms an image on the retina through the pupil 191 of the eyeball 190 located at the eyeball assumed position, whereby the image is displayed to the user. An eyeball center 192 shown in FIG. 3 is a center position of the eyeball 190, and is a center of rotation of the eyeball 190. The eyeball assumed position may be slightly displaced from the pupil center 193. Further, the eyeball assumed position may coincide with the eyeball center 192 or a tip end of the pupil 191, in place of the pupil center 193.

When the user wears the HMD 100 shown in FIG. 3 on the head (namely, when a temple portion 111 is worn on the ear), the positional relationship between the spatial modulation element 103 and the eyeball assumed position is fixed. The eyeball assumed position may include an allowable error, or the HMD 100 may have a function of adjusting the eyeball assumed position, taking into consideration of individual differences in the position of the eyeball 190 with respect to the user's head portion or a mounting deviation of the HMD 100.

The control unit 105 drives the light source 101 to cause the spatial modulation element 103 to display a diffraction pattern. The control unit 105 turns on and off the light source 101, and adjusts the intensity of laser light to be outputted from the light source 101 so that an appropriate light amount is incident on the eyeball. In this embodiment, the control unit 105 displays a color image by driving laser light sources with time-division for outputting light of three colors, and by synchronizing the display of the diffraction patterns respectively corresponding to the three colors with the laser light sources.

Further, the control unit 105 may control a battery 106. Further, in the case where the control unit 105 is capable of controlling the illumination optical system 102 and the reflection mirror 104, the control unit 105 may also control the illumination optical system 102 and the reflection mirror 104.

The battery 106 supplies electric power to the respective parts of the HMD 100 such as the control unit 105 and the spatial modulation element 103. The battery 106 in the first embodiment is a rechargeable battery, and is charged during a time when the user does not wear the HMD 100. The battery 106 is disposed near a rear end of an ear-side portion of the temple portion 111. The above configuration is advantageous in securing the total weight balance on the ear side, thereby suppressing slipping off of the front portion 112. The battery 106 may not be a rechargeable battery, but electric power may be supplied to the HMD 100 during usage of the HMD 100. Further, electric power may be supplied to the HMD 100 from an external power source, or the HMD 100 may be provided with an electric power generating means.

The HMD 100 in the form of eyeglasses shown in FIG. 3 is constituted by the temple portion 111 that is positioned on the side of the head, and the front portion 112 that is positioned in front of an eye. The light source 101, the illumination optical system 102, the spatial modulation element 103, the control unit 105, and the battery 106 are disposed in the temple portion 111. An emission window 114 is formed in the temple portion 111 so that the diffracted light from the spatial modulation element 103 is emitted to the reflection mirror 104.

The front portion 112 includes the lens portion 113. The reflection mirror 104 is disposed in a part (front surface or inside) of the lens unit 113. The reflection mirror 104 in the first embodiment transmits the outside view while reflecting the display light, but the reflection mirror 104 may be configured such that the outside view is not transmitted. Further, the front portion 112 and the temple portion 111 may be folded for enhanced portability. In this case, a folding position may be an end of the temple portion 111, or may be the ear side with respect to the spatial modulation element 103. In this embodiment, the lens portion 113 is not necessarily a lens for near-sightedness like an ordinary eyeglass lens, or is not necessarily a lens for correcting far-sightedness or astigmatism. Further, the lens portion 113 may have a function of lowering a transmittance, or may have a polarization function like a sunglass lens. Further, the lens portion 113 may prevent reflection of unwanted light, or may include a film having a function to prevent contamination.

In the first embodiment, as shown in FIG. 3, the HMD 100 is configured to display a fictive image on both of the left and right eyes of the user. Accordingly, as shown in FIG. 3, the same constituent elements as those for the right eye portion of the HMD 100 are disposed for the left eye portion of the HMD 100. The constituent elements for the left eye portion of the HMD 100 are indicated with the reference numerals attached with a suffix "a" to the reference numerals of the corresponding constituent elements for the right eye portion. The constituent elements for the left eye portion have the same functions as the corresponding constituent elements for the right eye portion. In this configuration, it is possible to correct diffraction patterns according to the eyesights of the left eye and the right eye of the user, even if the user has different eyesights between the left and right eyes.

In the case where an image is displayed to both eyes, the HMD 100 may not be provided with all the constituent elements for the left eye portion and the right eye portion. For instance, the control unit 105 may be provided only in the right eye portion, and the control unit 105 in the right eye portion may simultaneously control displays for the left and right eyes without disposing the control unit 105a in the left eye portion. In this case, it is possible to display an image without a sense of incongruity to the user who does not substantially have an eyesight difference between the left and right eyes. Further, it has an advantageous effect that the number of parts of the HMD 100 is reduced, and the cost and the weight of the HMD 100 are reduced. Further, the control unit 105 in the right eye portion may generate a diffraction pattern for the right eye and a diffraction pattern for the left eye, which are different from each other, without disposing the control unit 105a in the left eye portion.

In the following, to simplify the description, the description is made based on the premise that the control unit 105 in the right eye portion also controls the light source 101a, the spatial modulation element 103a, and the like in the left eye portion. Further, in the following, unless specifically mentioned, a diffraction pattern is also displayed on the spatial modulation element 103a, even in the case where the specification only describes that a diffraction pattern is displayed on the spatial modulation element 103.

In this embodiment, the temple portions 111 and 111a correspond to an example of a mounting portion, the light source 101 corresponds to an example of a first light source, the illumination optical system 102 corresponds to an example of a first illumination optical system, the spatial modulation element 103 corresponds to an example of a first spatial modulation element, the light source 101a corresponds to an example of a second light source, the illumination optical system 102a corresponds to an example of a second illumination optical system, and the spatial modulation element 103a corresponds to an example of a second spatial modulation element.

The distance as indicated by the reference numeral 121 in FIG. 3 represents a distance from the user's eyeball assumed position (in this embodiment, the pupil center 193 as described above) to the reflection mirror 104, and the distance as indicated by the reference numeral 122 in FIG. 3 represents a distance from the reflection mirror 104 to the spatial modulation element 103. Further, in the present specification, the sum of the distance 121 and the distance 122 is referred to as a distance (or an optical axis distance) from the eyeball assumed position to the spatial modulation element 103.

Figure 8:
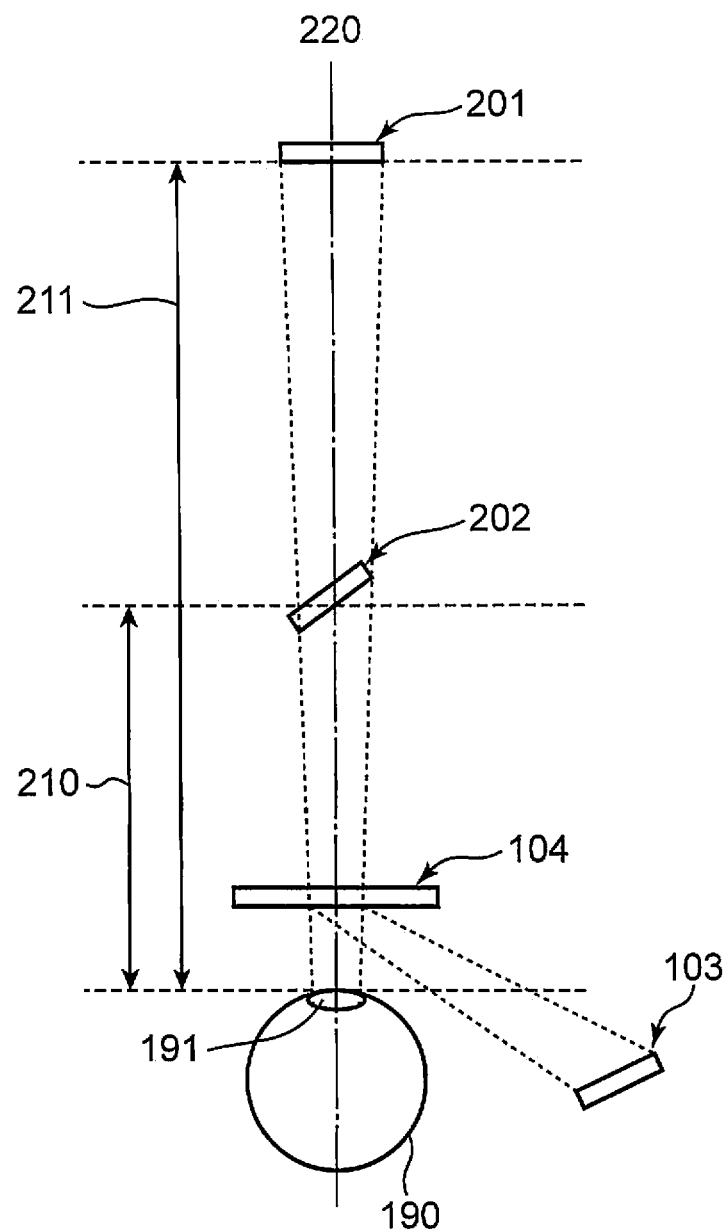
FIG. 8 is a diagram describing a positional relationship between a spatial modulation element and a reproduced image according to the first embodiment of the invention.
Figure 9:
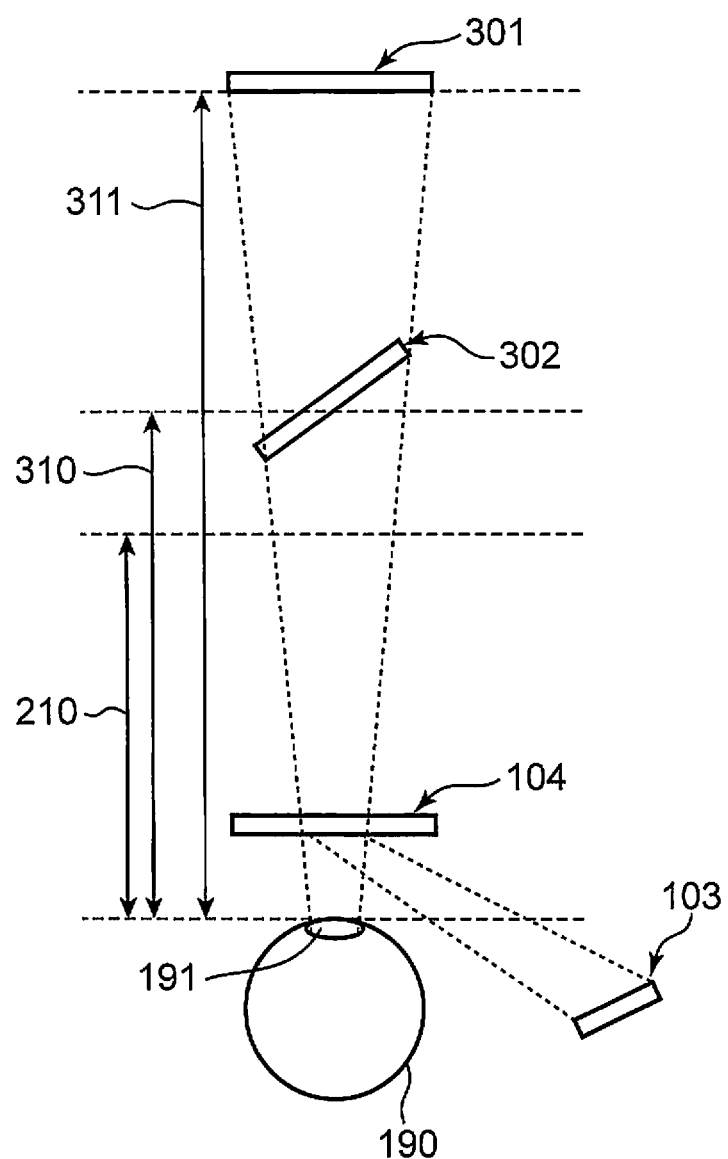
FIG. 9 is a diagram describing a positional relationship between a spatial modulation element and a reproduced image according to the first embodiment of the invention.

FIG. 8 and FIG. 9 are explanatory diagrams of positional relationships between the eyeball 190, the reflection mirror 104, the spatial modulation element 103, a reproduced image (fictive image) by a diffraction pattern, and the like.

The positions of the eyeball 190, the reflection mirror 104, and the spatial modulation element 103 are as shown in FIG. 8. In the case where the optical magnification of the reflection mirror 104 is one, a virtual image 202 of the spatial modulation element 103 is located at such a position as shown in FIG. 8. The distance from the pupil center of the eyeball 190 to the virtual image 202 is equal to a "distance 210 to the spatial modulation element 103", which is the sum of the distance 121 from the pupil center of the eyeball 190 to the reflection mirror 104, and the distance 122 from the reflection mirror 104 to the spatial modulation element 103. In the example shown in FIG. 8, the spatial modulation element 103 is disposed obliquely with respect to an optical axis 220. The distance in the above case is a distance, in which the center point of the spatial modulation element 103 is used as a reference. A point other than the center point may be used as a reference.

Further, as shown in FIG. 9, in the case where the optical magnification of the reflection mirror 104 is larger than one, a virtual image 302 of the spatial modulation element 103 is located at such a position as shown in FIG. 9. A distance 310 from the pupil center of the eyeball 190 to the virtual image 302 of the spatial modulation element 103 is longer than the aforementioned "distance 210 to the spatial modulation element 103", and accordingly, the virtual image 302 becomes larger than the virtual image 202.

Figure 26A:
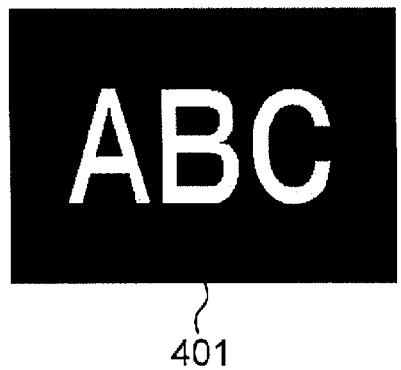
FIGS. 26A and 26B are diagrams showing an example of a display image and a diffraction pattern.
Figure 26B:
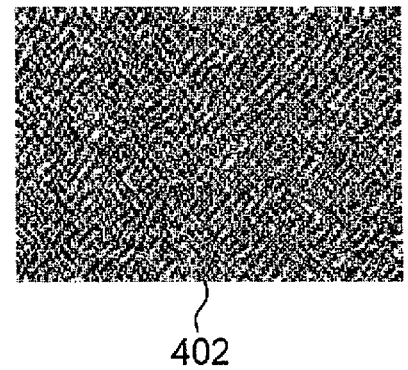
Figure 27:
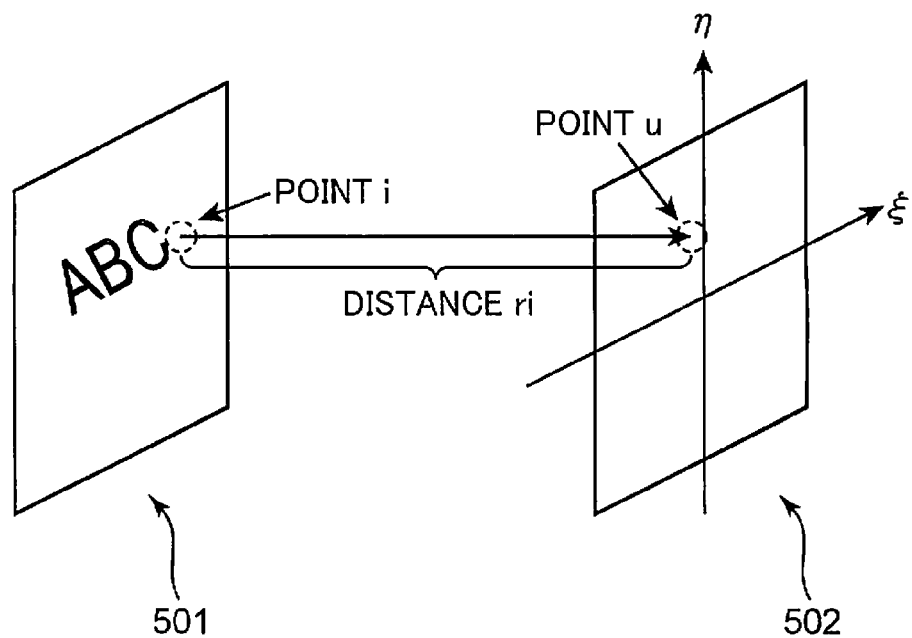
FIG. 27 is a diagram showing an example of a positional relationship between a display image and a liquid crystal panel (spatial modulation element)

Displaying a diffraction pattern (e.g. the diffraction pattern 402 shown in FIG. 26B) on the spatial modulation element 103 makes it possible for the user to see the fictive image 201 shown in FIG. 8 and the fictive image 301 shown in FIG. 9 (e.g. the original image (fictive image) 401 shown in FIG. 26A). In this example, a distance 211, 311 to the fictive image can be changed by calculation of a diffraction pattern. Accordingly, for instance, it becomes possible to appropriately adjust the distance from the eyeball 190 to the fictive image according to the user's eyesight. In the first embodiment, the HMD 100 adjusts the distance according to the user's eyesight by correcting a diffraction pattern received from the computer terminal 901. This process will be described later.

A part of the functions of the respective parts of the HMD 100 described in this embodiment may be implemented by a device other than the HMD 100. Further, a function that is not described in the embodiment may be loaded in the HMD 100. For instance, the light source 101 may be provided in an external device, and an optical fiber may transmit light outputted from the light source 101. Further, for instance, the battery 106 may be provided in an external device, and may be connected to the HMD 100 via a power source cord. Further, the HMD 100 may include, as other functions, a camera, various sensors such as an angular velocity sensor, a temperature sensor, and a GPS, input devices such as a switch, and output devices such as a speaker. The same idea is applied to the following embodiment and modifications to be described later.

Displaying a diffraction pattern on the spatial modulation element 103 with use of the HMD 100 by a CGH method as shown in FIG. 1 and FIG. 3 makes it possible to generate a fictive image at a position away from the eyeball 190 of the user, without increasing the size of the illumination optical system 102 and the like.

Referring to FIG. 2, the contents management unit 1201 manages display contents such as still images or moving images to be displayed to the user. In this embodiment, there is described an example, in which still images are used as display contents. However, moving images or text contents (e.g. mail messages or Web pages) may be used as display contents.

The contents management unit 1201 may hold the display contents displayable to the user in an internal recording unit thereof. Alternatively, the contents management unit 1201 may hold the address of the display contents e.g. a Uniform Resource Locator (URL) on the Internet, and may acquire the display contents via the communication unit 1203, as necessary.

In the case where the contents management unit 1201 holds the display contents, access to the display contents can be performed at a higher speed. Further, in the case where the contents management unit 1201 holds the address of the display contents, the capacity of the recording unit can be made smaller, and hence, it becomes possible to reduce the cost of the computer terminal 901, for instance.

The diffraction calculation unit 1202 computes a basic diffraction pattern to be transmitted to the HMD 100, from the display contents acquired by the contents management unit 1201. In this embodiment, the diffraction calculation unit 1202 handles, as a basic diffraction pattern, a pattern obtained by applying an inverse Fourier transform process to an image (e.g. the original image 401 shown in FIG. 26A) acquired from the contents management unit 1201.

Further, in this embodiment, the diffraction calculation unit 1202 converts image data into complex amplitude data having a real part and an imaginary part by superimposing a phase pattern on a pixel value of an image acquired from the contents management unit 1201.

In performing the above process, the diffraction calculation unit 1202 generates a phase value phase_data present in the range from 0 to $2\pi$, and thereafter, generates complex amplitude data with respect to each of the pixels of an image to be displayed to the user by performing the computation process as expressed by the following formulas (4) and (5) with respect to each pixel value Image_A of the image.

$$\text{Image\_Re} = \text{Image\_A} \times \text{Cos}(\text{phase\_data}) \quad (4)$$

$$\text{Image\_Im} = \text{Image\_A} \times \text{Sin}(\text{phase\_data}) \quad (5)$$

In the present specification, the real part and the imaginary part of complex amplitude data generated with respect to each of the pixels are described as a converted pixel value real part Image_Re and a converted pixel value imaginary part Image_Im. The diffraction calculation unit 1202 is capable of generating a basic diffraction pattern by converting image data of an image into complex amplitude data as described above, and then executing an inverse Fourier transform.

In this embodiment, each of the pixels of an original image has three pixel values corresponding to RGB colors, and the diffraction calculation unit 1202 performs a complex amplitude data conversion process and an inverse Fourier transform process with respect to each of RGB colors. Namely, three basic diffraction patterns corresponding to the wavelengths of RGB colors are generated from one original image having RGB data. In the present specification, to simplify the description, there is described a process of generating a diffraction pattern corresponding to one of RGB colors.

The computation of a basic diffraction pattern may be performed by a process other than the inverse Fourier transform. For instance, the diffraction calculation unit 1202 may employ computation by a point filling method as expressed by the aforementioned formulas (1) through (3).

As described above, the formula (1) represents a complex amplitude of light from the point light source "i" at the point "u". The formula (2) represents a distance between the point light source "i" and the point "u" on the spatial modulation element. The formula (3) represents a complex amplitude of light at the point "u" on the spatial modulation element. In this configuration, it is possible to set free distance information such as viewing distances which are different from each other in each of the pixels of an image to be displayed. This embodiment is made based on the premise that an image based on which diffraction data is generated is a color image having RGB data. Alternatively, it is possible to process an image of one color. In the modification, the diffraction calculation unit 1202 may generate a basic diffraction pattern of only one kind, which makes it possible to reduce the computation load on the computer terminal 901.

The communication unit 1203 performs communication with the HMD 100. For instance, the communication unit 1203 receives a diffraction pattern generation request from the HMD 100, and transmits a basic diffraction pattern generated by the computer terminal 901. In this embodiment, the communication unit 1203 performs communication with the HMD 100 via a communication network 900 e.g. the Internet. The communication unit 1203 can use e.g. the Ethernet as a communication protocol. The communication unit 1203 is not necessarily limited to a specific communication means. The communication unit 1203 may be connected to the communication network 900 with use of a wireless LAN such as Wi-Fi, or may have a configuration to be connected to a mobile phone communication network.

The display terminal management unit 1204 manages the information on the HMD 100 to be communicated with the computer terminal 901. In the case where the computer terminal 901 transmits a basic diffraction pattern to a plurality of display terminals such as a plurality of HMDs, storing the communication addresses (e.g. the IP addresses) of the respective display terminals enables to transmit a generated basic diffraction pattern, with use of the communication unit 1203.

FIG. 10 is a diagram showing an example of a display terminal management table which the display terminal management unit 1204 holds, in this embodiment. In the example shown in FIG. 10, the display terminal management unit 1204 holds communication addresses and communication means of the display terminals 905 through 907. The contents of the display terminal management table may be described in another format, or may include another information. The display terminal management table may include security information (e.g. passwords) to be used in communication with the display terminals. The modification makes it possible to generate a basic diffraction pattern, taking into consideration of the security.

The computer terminal 901 is not necessarily constituted of one terminal device. As shown in FIG. 28, the computer terminal 901 may be constituted of a plurality of server terminals. According to this case, it is possible to enhance the computing capacity of the computer terminal 901. Further, it has an advantageous effect that it is easy to respond to a request from a plurality of display terminals at the same time. Further, the computer terminal 901 may have a function other than the functions shown in FIG. 2. For instance, the computer terminal 901 may be provided with a function of executing other applications such as a mail server application. According to this case, it has an advantageous effect that it becomes easy to acquire data from the other applications being executed on the one terminal by the contents management unit 1201.

Figure 11:
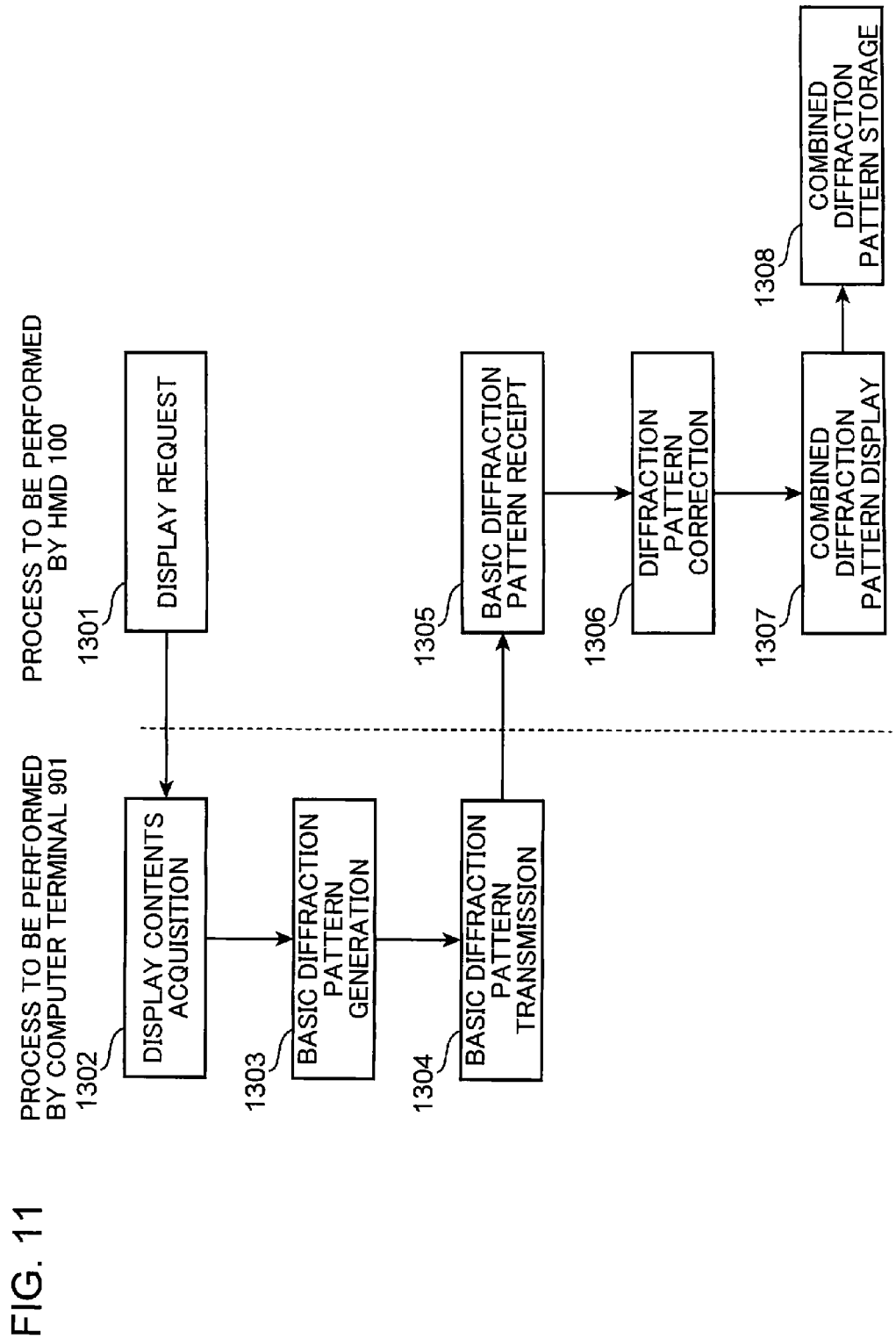
FIG. 11 is a process flow chart for correcting a diffraction pattern according to the first embodiment.

FIG. 11 is a flowchart showing a sequence of generating a diffraction pattern in the first embodiment. There is described an example of a method for generating diffraction patterns suitable for individual users by correcting a basic diffraction pattern generated in the computer terminal 901 with use of the HMD 100, referring to FIG. 1, FIG. 2, and FIG. 11. In this embodiment, the HMD 100 and the computer terminal 901 perform a control of generation and display of diffraction patterns by executing the processes of Steps 1301 through 1308 shown in FIG. 11.

<Step 1301: Contents Acquisition Request>

The display control unit 1103 of the HMD 100 decides display information to be displayed to the user, and issues a contents acquisition request to the computer terminal 901, with use of the communication unit 1105.

The information to be notified to the computer terminal 901 includes at least the communication address of the HMD 100, and identification information (e.g. URL) of display information to be requested.

The contents acquisition request to be transmitted to the computer terminal 901 may include information other than the identification information of display information. For instance, the contents acquisition request may include authentication information for use in utilizing a server holding the display information. In this case, the HMD 100 is capable of acquiring, as the display information, highly confidential service information such as a mail service or a social network service.

In this embodiment, the communication unit 1105 holds in advance the communication address of the computer terminal 901. Alternatively, a functional block other than the communication unit 1105 may hold the communication address of the computer terminal 901. For instance, the display control unit 1103 may hold the communication address of the computer terminal 901.

Means for deciding the display information to be displayed to the user by the display control unit 1103 is not limited to a specific method. The HMD 100 may be provided with a selection User Interface (UI) for the user to select information, and the display information may be determined according to the user's operation of the selection UI. Further, it is possible to use a method for automatically deciding the display information by the display control unit 1103. The latter modification makes it possible to reduce the user's operation load in selecting the information.

In this embodiment, there is described an example, in which the computer terminal 901 to which the display control unit 1103 issues a contents acquisition request is a specific computer terminal configured such that the communication unit 1105 holds a communication address in advance. The display control unit 1103 may simultaneously issue a contents acquisition request to a plurality of computer terminals. Further alternatively, the display control unit 1103 may use a method for dynamically acquiring the address of a computer terminal. For instance, as shown in a service according to the Digital Living Network Alliance (DLNA) standards, it is possible to use a configuration of searching whether there is a terminal device which provides a service for generating a basic diffraction pattern on the communication network 900. In this case, the HMD 100 is capable of searching a computer terminal optimal for the HMD 100.

<Step 1302: Display Contents Acquisition>

In Step 1302, the communication unit 1203 of the computer terminal 901 receives a contents acquisition request from the HMD 100, and then, the contents management unit 1201 acquires display information included in the request. In the case where the contents management unit 1201 holds the display information requested from the HMD 100, the contents management unit 1201 notifies the diffraction calculation unit 1202 of the display information.

In the case where the contents management unit 1201 does not hold the display information included in the contents acquisition request from the HMD 100, the contents management unit 1201 performs communication with another terminal device (e.g. a Web server) holding the display information via the communication unit 1203, and acquires the display information. The contents management unit 1201 can judge, from which terminal device the display information is to be acquired, from the identification information of the display information included in the contents acquisition request that has been transmitted from the HMD 100. After acquisition of the display information, the contents management unit 1201 notifies the diffraction calculation unit 102 of the acquired display information. Further, the communication address of the HMD 100 included in the contents acquisition request is notified from the communication unit 1203 to the display terminal management unit 1204 and is stored in the display terminal management unit 1204.

By holding the display information acquired from another terminal device in the contents management unit 1201, it is possible to perform the process of acquiring display information at a high speed, in the case where a similar contents acquisition request for the display information is issued again.

<Step 1303: Basic Diffraction Pattern Generation>

In Step 1303, the diffraction calculation unit 1202 of the computer terminal 901 generates a basic diffraction pattern from the display information notified from the contents management unit 1201 in Step 1302.

As described above, in this embodiment, the diffraction calculation unit 1202 handles, as a basic diffraction pattern, a pattern obtained by applying an inverse Fourier transform process to an image acquired from the contents management unit 1201. Accordingly, the diffraction calculation unit 1202 performs a complex amplitude data process with respect to a display image by superimposing phase data on each pixel of the acquired display image, and generates converted-pixel-value-real-part Image_Re and a converted-pixel-value-imaginary-part Image_Im from the pixel value Image_A, pixel by pixel. This process is executed by performing the computation as expressed by the aforementioned formulas (4) and (5) for each pixel value Image_A of a display image. In performing the computation, phase value phase_data is selected at random from the range between zero and $2\pi$.

The formula (4) represents a real part of an image which is a computation target of a diffraction pattern, and the formula (5) represents an imaginary part of an image which is a computation target of a diffraction pattern.

In this embodiment, the diffraction calculation unit 1202 selects a phase value phase_data at random. Alternatively, the diffraction calculation unit 1202 may employ another method. For instance, the diffraction calculation unit 1202 may perform a process, in which phases different from each other are applied to pixels adjacent to each other. According to this case, there is an advantageous effect that noise generation is suppressed in performing display by a CGH method.

The diffraction calculation unit 1202 executes an inverse Fourier transform with respect to a display image which has been converted to a complex amplitude data, and notifies the communication unit 1203 of the computation result as a basic diffraction pattern. By using an inverse Fourier transform, the diffraction calculation unit 1202 can generate a basic diffraction pattern at a high speed.

The diffraction calculation unit 1202 may generate a basic diffraction pattern by performing a computation other than the inverse Fourier transform. For instance, as described above, the diffraction calculation unit 1202 may generate a basic diffraction pattern by performing a point filling method.

The diffraction calculation unit 1202 may be provided with a function of holding a once generated basic diffraction pattern. In this case, the diffraction calculation unit 1202 can utilize an already held basic diffraction pattern, without performing a computation process again, when a request for computing a basic diffraction pattern with respect to the same display information is received from another terminal device. As a result, it becomes possible to significantly reduce the computation load on the computer terminal 901.

<Step 1304: Basic Diffraction Pattern Transmission>

In Step 1304, the communication unit 1203 transmits, to the HMD 100, a basic diffraction pattern computed by the diffraction calculation unit 1202 in Step S1303. At the time of transmission, the communication unit 1203 acquires the communication address of the HMD 100 from the display terminal management unit 1204, and transmits the basic diffraction pattern.

<Step 1305: Basic Diffraction Pattern Receipt>

In Step 1305, the communication unit 1105 of the HMD 100 receives a basic diffraction pattern transmitted from the computer terminal 901, and notifies the diffraction pattern process unit 1101 of the received basic diffraction pattern. In this embodiment, the communication unit 1105 corresponds to an example of a diffraction pattern acquiring unit.

<Step 1306: Diffraction Pattern Correction>

In Step 1306, the diffraction pattern process unit 1101 applies a correction process to the basic diffraction pattern notified from the communication unit 1105 in Step 1305, and generates a combined diffraction pattern to be displayed to the user.

As described above, in the CGH display, it is necessary to generate a diffraction pattern according to the user's eyesight. In this embodiment, the user's eyesight is not considered in generating a basic diffraction pattern. Accordingly, the diffraction pattern process unit 1101 corrects the basic diffraction pattern according to the user's eyesight.

Figure 12:
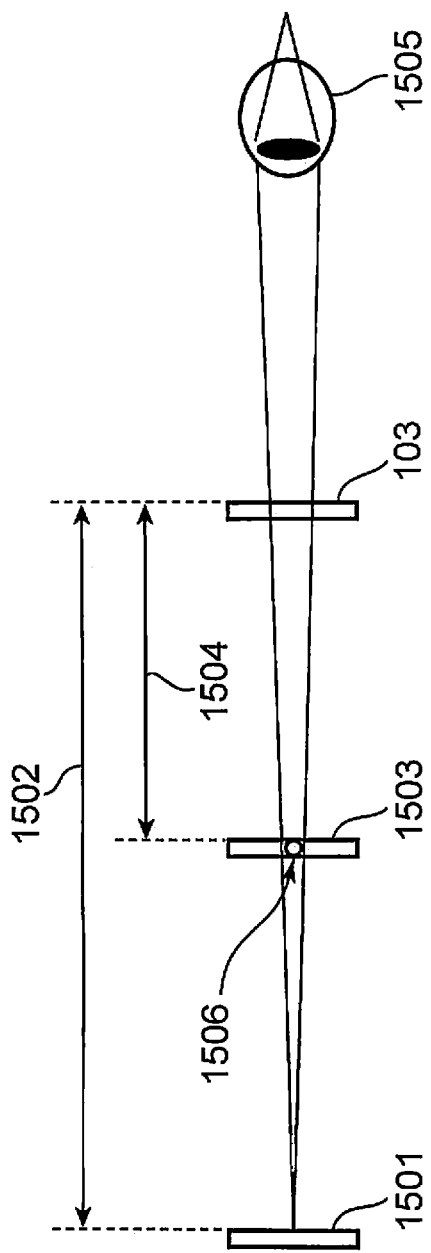
FIG. 12 is a diagram showing an example of a positional relationship between a reproduced image generated by a basic diffraction pattern, and a reproduced image generated by a diffraction pattern after correction.

FIG. 12 is a diagram showing an example of a difference in the display position of a reproduced image by a diffraction pattern. Referring to FIG. 12, a reproduced image 1501 before correction corresponds to the position of a display image (fictive image), in the case where a basic diffraction pattern is displayed on the spatial modulation element 103 of the HMD 100. In the case where a basic diffraction pattern is generated by an inverse Fourier transform, light directing from the reproduced image 1501 before correction toward a user 1505 is parallel light. Accordingly, a distance 1502 before correction, which is a distance between the spatial modulation element 103 and the reproduced image 1501 before correction, is an infinite distance.

In the case where the eyesight of the user 1505 is good, it is possible to collect the parallel light incident on the user's pupil onto the retina. However, in the case where the eyesight of the user 1505 is poor, it is impossible for the user 1505 to clearly see the reproduced image. In view of the above, it is necessary to set the reproduced image to a position close to a distance 1504 after correction, which is a distance at which the user 1505 can see the reproduced image. Accordingly, the diffraction pattern process unit 1101 overlaps a correction diffraction pattern on the basic diffraction pattern for moving the reproduced image 1501 before correction to the position of the reproduced image 1503 after correction.

In this embodiment, the diffraction pattern process unit 1101 acquires, from the correction pattern management unit 1102, a correction diffraction pattern to be overlapped on a basic diffraction pattern. The correction pattern management unit 1102 holds a correction diffraction pattern according to the user's eyesight. A correction diffraction pattern to be used in this embodiment is constituted of a phase pattern to be obtained in the case where light from a point light source, which is virtually located at the position of a reproduced image whose complex amplitude has been corrected, in other words, at a correction center 1506 shown in FIG. 12, is incident on the spatial modulation element 103. Further, data on the correction diffraction pattern is generated corresponding to each of the pixels of the basic diffraction pattern.

In the HMD 100, in the case where a basic diffraction pattern is displayed on the spatial modulation element 103, "r" denotes a distance between a pixel ($\xi$, $\eta$) on the basic diffraction pattern (spatial modulation element 103), and the correction center 1506. In this configuration, a real part Correct_Re and an imaginary part Correct_Im of the data of a correction diffraction pattern corresponding to the pixel ($\xi$, $\eta$) are expressed by the following formulas (6) and (7).

$$Correct\_Re = \cos(2\pi \times r/\lambda) \quad (6)$$

$$Correct\_Im = -\sin(2\pi \times r/\lambda) \quad (7)$$

The symbol $\lambda$ in the formulas (6) and (7) denotes a wavelength of the light source 101 in displaying a diffraction pattern. In the case where display of an image of three colors of RGB is performed, it is necessary to hold correction diffraction patterns of three kinds corresponding to the respective wavelengths. As described above, however, in this embodiment, there is described a method for correcting a diffraction pattern with respect to one wavelength to simplify the description.

The diffraction pattern process unit 1101 overlaps a correction diffraction pattern acquired from the correction pattern management unit 1102 on a basic diffraction pattern acquired from the computer terminal 901, and generates a combined diffraction pattern after correction. At the time of generation, a real part Combined_Re of each of the pixels of the combined diffraction pattern is computed by the following formula (8). Likewise, an imaginary part Combined_Im of each of the pixels of the combined diffraction pattern is computed by the following formula (9).

$$Combined\_Re = Image\_Re \times Correct\_Re - Image\_Im \times Correct\_Im \qquad (8)$$

$$Combined\_Im = Image\_Re \times Correct\_Im - Image\_Im \times Correct\_Re \qquad (9)$$

By performing the above process, the diffraction pattern process unit 1101 makes it possible to set the position of a reproduced image by a combined diffraction pattern after correction to the position according to the user's eyesight.

In the case where the correction pattern management unit 1102 holds a correction diffraction pattern in advance, the computation amount required for overlapping the correction diffraction pattern on a basic diffraction pattern by the diffraction pattern process unit 1101 lies in the order of the second power of N, in the case where the pixel number of the basic diffraction pattern is N×N. Therefore, it is possible to reduce the computation load on the HMD 100, as compared with a case where all the diffraction patterns are computed in the HMD 100.

In this embodiment, the correction pattern management unit 1102 holds in advance correction diffraction patterns according to the user's eyesight. The correction pattern management unit 1102 may employ a method for computing a correction diffraction pattern, as necessary, by executing the computations as represented by the formulas (6) and (7), each time a correction diffraction pattern is requested from the diffraction pattern process unit 1101. In this case, it becomes possible to omit a recording unit necessary for storing correction diffraction patterns, for instance.

Further, in this embodiment, the correction pattern management unit 1102 holds in advance a distance "r" between the correction center and each pixel in the formulas (6) and (7) according to users who wear the HMD 100. Alternatively, another method may be employed. For instance, an input portion for inputting the user's eyesight may be provided in the HMD 100, and the correction pattern management unit 1102 may update the information relating to the distance "r" based on the input result. In this case, it becomes easy to modify the correction diffraction pattern by inputting an eyesight optimal for a user, each time the user is changed, in the case where a plurality of users use the HMD 100.

The diffraction pattern process unit 1101 notifies the display control unit 1103 of a combined diffraction pattern generated with use of a basic diffraction pattern and a correction diffraction pattern.

<Step 1307: Combined Diffraction Pattern Display>

In Step 1307, the display control unit 1103 controls the light source 101 and the spatial modulation element 103 to display to the user a fictive image based on a combined diffraction pattern generated by the diffraction pattern process unit 1101 in Step 1306.

The combined diffraction pattern generated in Step 1306 is complex amplitude data constituted of a real part and an imaginary part. Accordingly, the display control unit 1103 quantizes a combined diffraction pattern so that the combined diffraction pattern has a data format displayable on the spatial modulation element 103.

In this embodiment, the spatial modulation element 103 is an element capable of expressing a phase value by two values of zero or π. Accordingly, the display control unit 1103 acquires real part data or imaginary part data of a combined diffraction pattern after correction, performs quantization to make the phase value equal to zero when the value of the acquired data is a positive value, and performs quantization to make the phase value equal to π when the value of the acquired data is a negative value. By performing the above process, for instance, even in use of a liquid crystal (e.g. ferroelectric liquid crystal) having a property such that only two phase values are displayable, as the spatial modulation element 103, the display control unit 1103 can display a combined diffraction pattern on the spatial modulation element 103.

In the case where an element capable of displaying two or more phase values is used as the spatial modulation element 103, the display control unit 1103 does not have to limit the quantization value to two values of zero or π, and may quantize to three or more values. In this case, it becomes possible to suppress noise generation in performing display by a CGH method, for instance.

The display control unit 1103 controls the spatial modulation element 103 and the light source 101 according to a combined diffraction pattern which has been quantized, and displays a fictive image corresponding to a combined diffraction pattern to the user.

Figure 13:
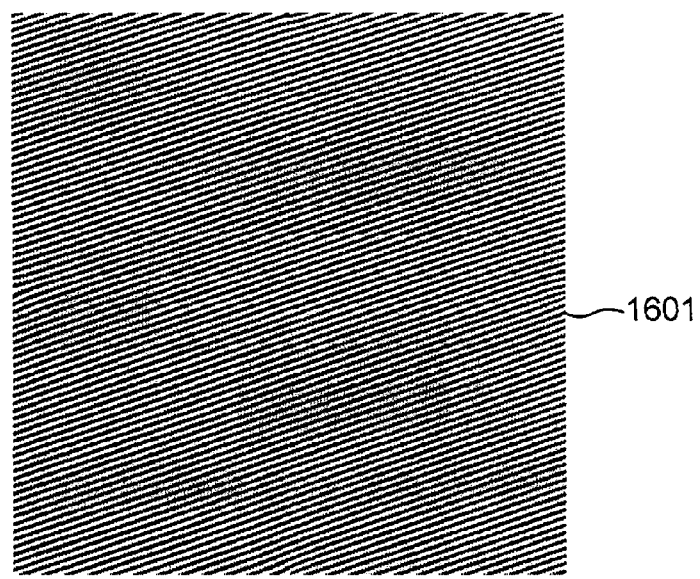
FIG. 13 is a diagram showing an example of a basic diffraction pattern.
Figure 14:
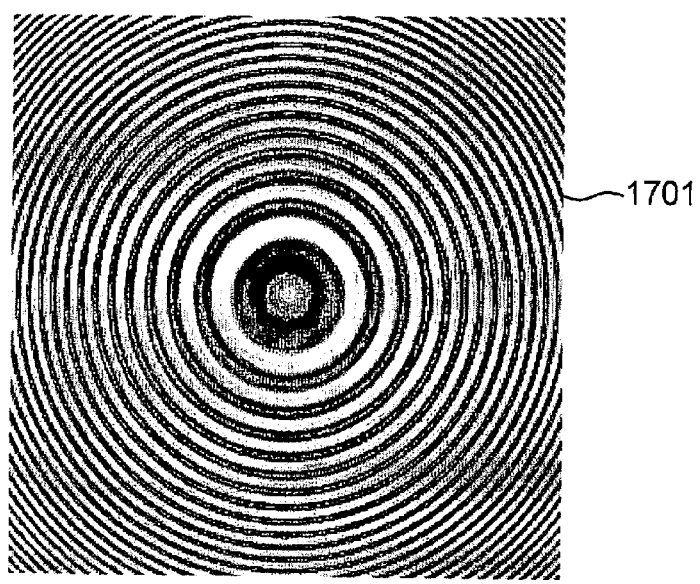
FIG. 14 is a diagram showing an example of a correction diffraction pattern.
Figure 15:
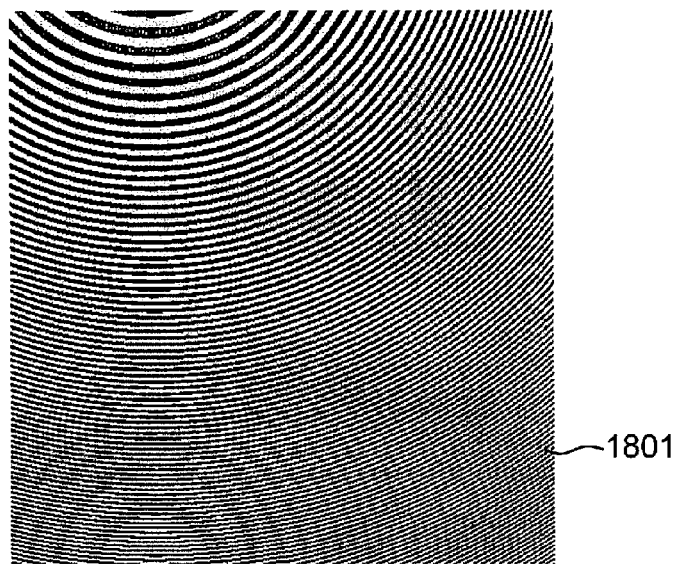
FIG. 15 is a diagram showing an example of a combined diffraction pattern after correction.

FIG. 13 is a diagram showing an example of a basic diffraction pattern 1601 in this embodiment. FIG. 14 is a diagram showing an example of a correction diffraction pattern 1701 in this embodiment. FIG. 15 is a diagram showing an example of a combined diffraction pattern 1801 generated from the data shown in FIG. 13 and FIG. 14.

FIG. 13 shows an example, in the case where there is a point, as an image to be displayed to the user, on a screen. Referring to FIG. 13, portions in the form of line having the same density indicate portions having the same phase. Further, FIG. 14 is a diagram representing a phase of light from a point light source disposed at the correction center 1506 (see FIG. 12). The diffraction pattern process unit 1101 generates the combined diffraction pattern 1801 shown in FIG. 15, with use of the basic diffraction pattern 1601 shown in FIG. 13, and the correction diffraction pattern 1701 shown in FIG. 14. The display control unit 1103 is capable of performing a display according to the user's eyesight by displaying the combined diffraction pattern 1801 shown in FIG. 15 on the spatial modulation element 103.

Figure 16:
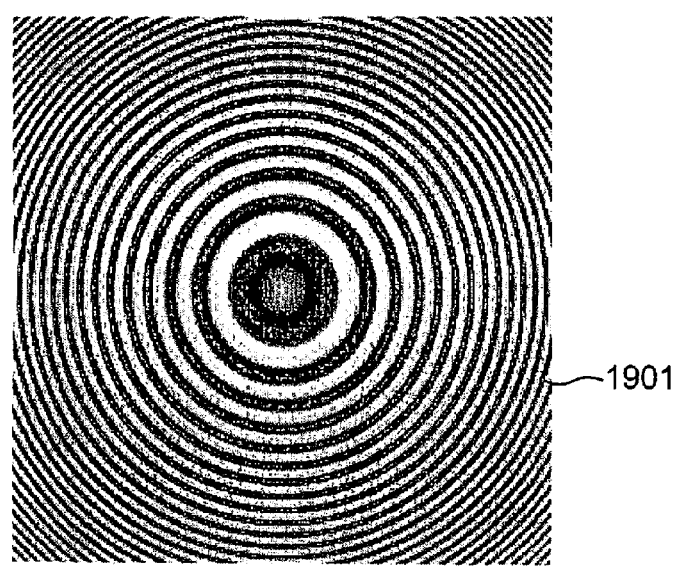
FIG. 16 is a diagram showing another example of the correction diffraction pattern.
Figure 17:
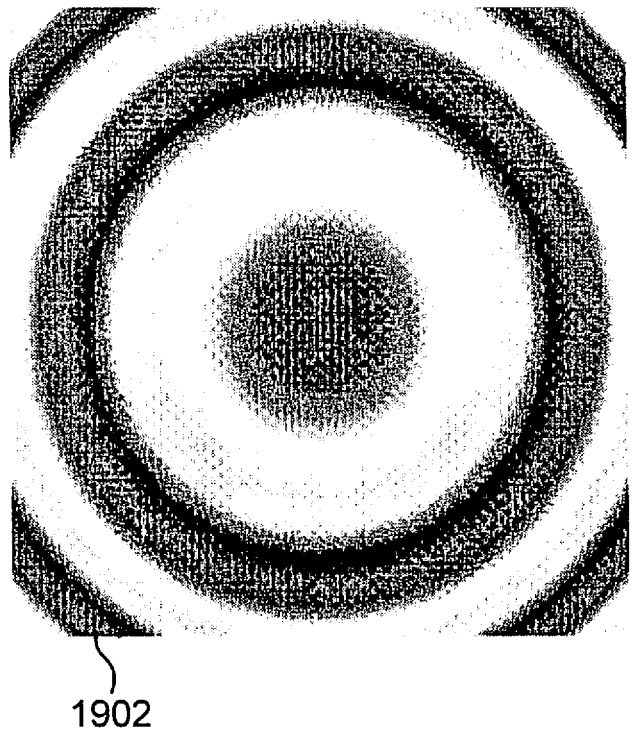
FIG. 17 is a diagram showing yet another example of the correction diffraction pattern.

FIG. 16 and FIG. 17 are diagrams showing an example, in which a correction diffraction pattern to be used changes according to the user's eyesight. A correction diffraction pattern 1901 shown in FIG. 16 is an example of a correction diffraction pattern, in the case where the correction center 1506 (see FIG. 12) is near the spatial modulation element 103, and is an example suited to a user whose eyesight is bad (user having a high degree of near-sightedness). A correction diffraction pattern 1902 shown in FIG. 17 is an example of a correction diffraction pattern, in the case where the correction center 1506 (see FIG. 12) is away from the spatial modulation element 103, and is an example suited to a user whose eyesight is relatively good (user having a low degree of nearsightedness). In this embodiment, the correction diffraction pattern 1901 corresponds to an example of a first correction diffraction pattern, the correction diffraction pattern 1902 corresponds to an example of a second correction diffraction pattern, a combined diffraction pattern generated with use of the basic diffraction pattern 1601 and the correction diffraction pattern 1901 corresponds to an example of a first combined diffraction pattern, and a combined diffraction pattern generated with use of the basic diffraction pattern 1601 and the correction diffraction pattern 1902 corresponds to an example of a second combined diffraction pattern.

The correction pattern management unit 1102 is capable of displaying a reproduced image (fictive image) at a position optimal for the user by changing the contents of a correction diffraction pattern according to the user's eyesight, as shown in FIG. 16 and FIG. 17.

Referring back to FIG. 11, in Step 1307, the display control unit 1103 notifies the diffraction pattern management unit 1104 of a combined diffraction pattern which has been quantized.

<Step 1308: Combined Diffraction Pattern Management>

In Step 1308, the diffraction pattern management unit 1104 stores a combined diffraction pattern notified from the display control unit 1103. For instance, in the case where it is impossible to acquire a basic diffraction pattern from the computer terminal 901 resulting from communication failure with the computer terminal 901 or the like, it is possible to continue display of still images or the like to the user by notifying the display control unit 1103 of a combined diffraction pattern held in the diffraction pattern management unit 1104.

As described above, in this embodiment, the computer terminal 901 generates a basic diffraction pattern requiring a large amount of computation, and transmits the generated basic diffraction pattern to the display terminals 905 through 907 (HMDs 100). The display terminals 905 through 907 (HMDs 100) generate combined diffraction patterns with use of a basic diffraction pattern, and correction diffraction patterns generated according to the eyesights of individual users. Generation of combined diffraction patterns is performed by a method capable of realizing with a less computation amount, which makes it possible to realize generation of diffraction patterns in the display terminals 905 through 907 (HMDs 100) having a low computing capacity, as compared with the computer terminal 901.

Further, correcting diffraction patterns according to the eyesights of users in the display terminals 905 through 907 (HMDs 100) eliminates the need for the computer terminal 901, which generates a basic diffraction pattern, to generate diffraction patterns different from each other for the respective display terminals 905 through 907 (HMDs 100).

As described above, in this embodiment, generation of a basic diffraction pattern, and correction of the basic diffraction pattern are performed by separate terminal devices in displaying a diffraction pattern on the spatial modulation element 103. With this, according to this embodiment, it is possible to reduce the computation load on the computer terminal 901 in responding to the display terminals 905 through 907 (HMDs 100) and to perform display according to the eyesight of user, while enabling to display diffraction patterns on the display terminals 905 through 907 (HMDs 100) having a low computing capacity.

In this embodiment, there is described an example, in which display information (fictive image) is a still image. For instance, in the case where display information (fictive image) is a moving image, the computer terminal 901 may successively compute a plurality of basic diffraction patterns corresponding to the respective frames of the moving image, and may successively transmit the computed basic diffraction patterns to the HMD 100, in response to a one-time contents acquisition request from the HMD 100. In this case, it becomes possible to display a moving image or the like to the user.

In this embodiment, data for performing correction according to the user's eyesight is used for a correction diffraction pattern. Alternatively, data other than the above data may be used for a correction diffraction pattern. For instance, data for correcting aberration of an optical system disposed between the light source 101 of the HMD 100 and the eyeball 190 of the user, may be used for a correction diffraction pattern. For instance, in the HMD 100 shown in FIG. 3, data for correcting aberration of an optical system including the illumination optical system 102 and the reflection mirror 104, may be used for a correction diffraction pattern.

In this case, the correction pattern management unit 1102 may hold in advance a correction diffraction pattern generated with use of data for correcting aberration of an optical system including the illumination optical system 102 and the reflection mirror 104. Alternatively, the correction pattern management unit 1102 may hold data representing aberration of an optical system including the illumination optical system 102 and the reflection mirror 104, and may generate a correction diffraction pattern with use of the data.

Generally, there are a great variety of designs of eyeglasses. Accordingly, in the eyeglass-type HMDs 100, aberration resulting from the layout of an optical system such as the illumination optical system 102 and the reflection mirror 104, which is changed by the design of each HMD 100, also varies depending on the design of each HMD 100. Therefore, for instance, the correction pattern management unit 1102 of each HMD 100 may hold a correction diffraction pattern for correcting aberration of the optical system of the HMD 100. Further, for instance, each of the display terminals 905 through 907 (see FIG. 7) may hold a correction diffraction pattern for correcting aberration of an optical system.

With this, it is enough for the computer terminal 901 to provide the same basic diffraction pattern to the display terminals 905 through 907 of different designs. As a result, it becomes possible to reduce the computation load on the computer terminal 901, and to enhance the quality of a fictive image to be displayed on the display terminals 905 through 907.

Further, data for performing correction according to the eyesight of the user of the HMD 100, and data for correcting aberration of an optical system disposed between the light source 101 of the HMD 100 and the eyeball 190 of the user, may be both used for the correction diffraction pattern. For instance, in the HMD 100 shown in FIG. 3, data for performing correction according to the user's eyesight, and data for correcting aberration of an optical system including the illumination optical system 102 and the reflection mirror 104, may be both used for the correction diffraction pattern.

In this case, the correction pattern management unit 1102 may hold a correction diffraction pattern generated in advance using both of the data for performing correction according to the user's eyesight, and the data for correcting aberration of an optical system including the illumination optical system 102 and the reflection mirror 104. Alternatively, the correction pattern management unit 1102 may hold data relating to the user's eyesight, and data representing aberration of an optical system including the illumination optical system 102 and the reflection mirror 104, and may generate a correction diffraction pattern using these data.

In this embodiment, there is described an example of a correction diffraction pattern for performing correction of the user's eyesight, in the case where the user is near-sighted. Alternatively, it is possible to use a correction diffraction pattern configured for a case, in which the user is astigmatic or far-sighted. For instance, in the case where the user is far-sighted, the correction pattern management unit 1102 may hold, as a correction diffraction pattern, a phase pattern to be obtained when light from a point light source virtually disposed between the spatial modulation element 103 and the eyeball 190 of the user is incident on the spatial modulation element 103. Further, the correction pattern management unit 1102 may generate a phase pattern to be utilized as a correction diffraction pattern, based on light from a light source whose focal lengths in a vertical direction and in a horizontal direction differ from each other, or light from a point light source that has passed through a cylindrical lens, for instance, in place of light from a point light source. In this case, it becomes possible to perform display of a fictive image more suitable for the user's eyesight.

In this embodiment, a correction diffraction pattern is generated with use of phase data to be obtained in the case where a point light source is virtually disposed at a position of a reproduced image suitable for the user's eyesight for performing correction according to the user's eyesight. Alternatively, a correction diffraction pattern for correcting the user's eyesight, which is generated with use of another phase data, may be used. For instance, the correction pattern management unit 1102 may hold a correction diffraction pattern generated with use of phase data, based on light from a light source other than a point light source (e.g. light from a light source whose focal lengths in a vertical direction and in a horizontal direction differ from each other, or light from a point light source that has passed through a cylindrical lens, for instance).

Second Embodiment

In this embodiment, there is described an example, in which the function of a display terminal which displays a diffraction pattern is separated into a plurality of terminal devices. In the above first embodiment, there is described an example, in which the control unit 105 is provided in the HMD 100. The control unit 105 or the like may be disposed in an external terminal device with respect to the HMD 100, as necessary.

Figure 18:
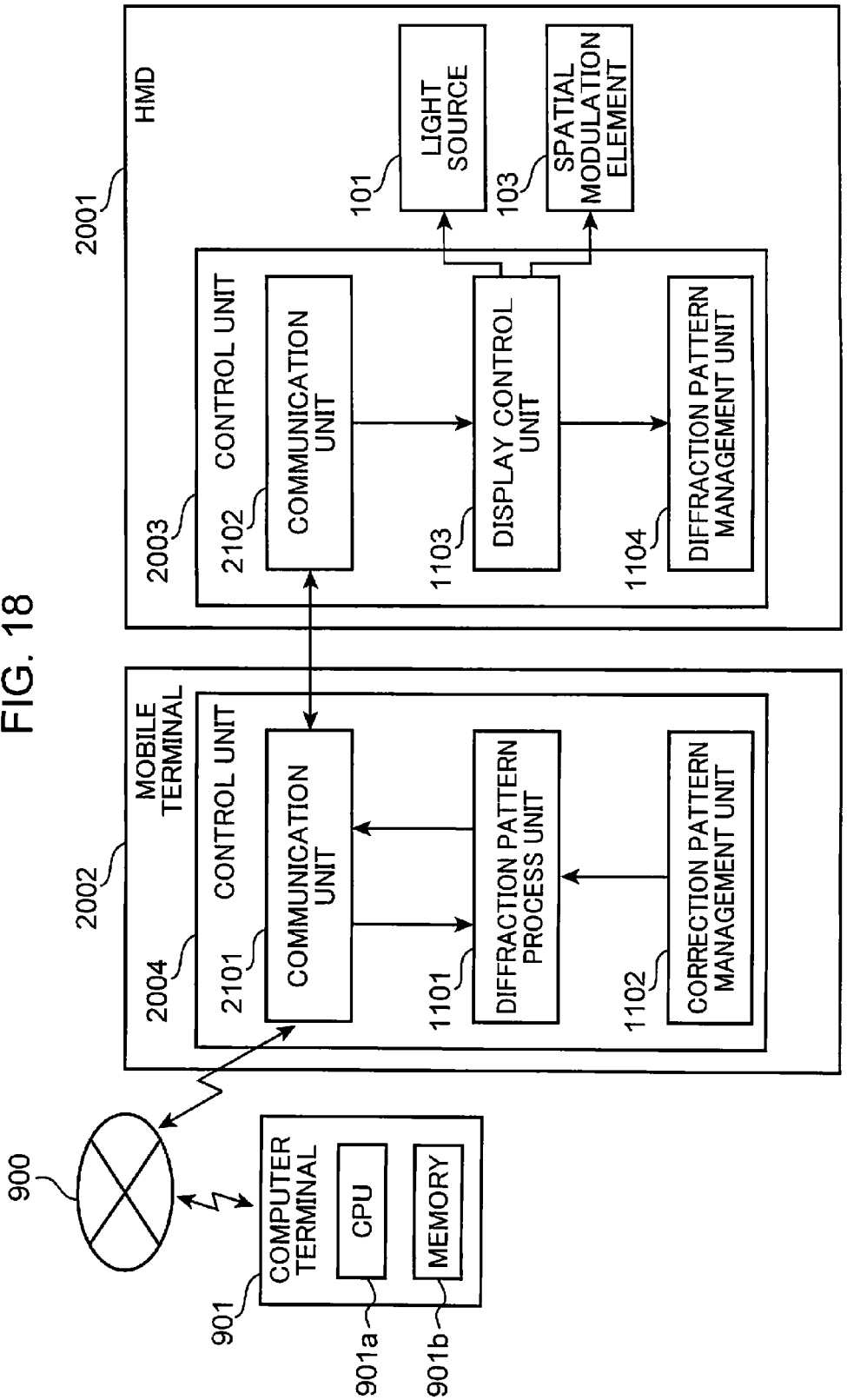
FIG. 18 is a diagram showing an example of a configuration of a display system according to a second embodiment of the invention.
Figure 19:
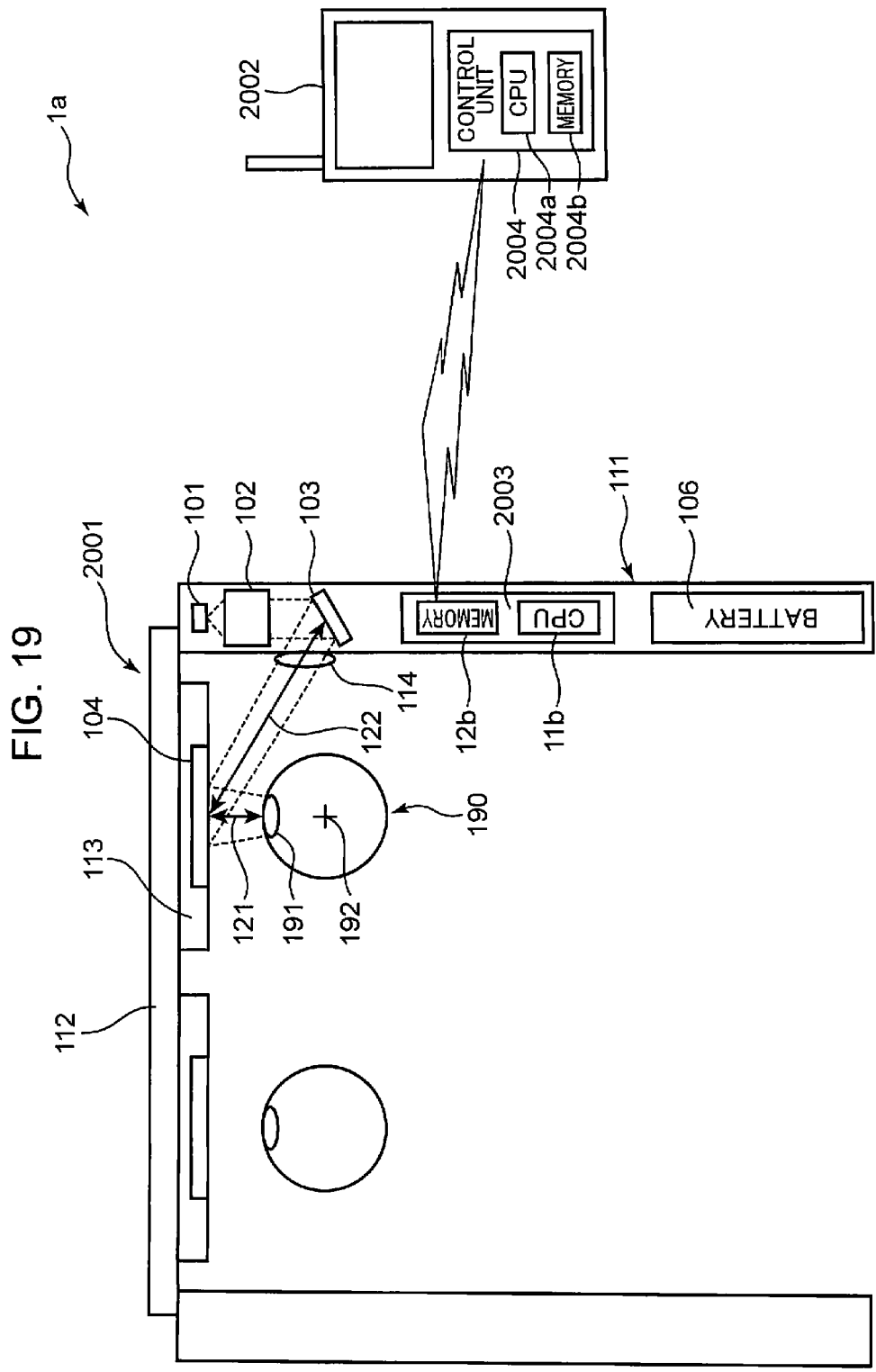
FIG. 19 is a configuration diagram of a display device according to the second embodiment of the invention.

FIG. 18 is a block diagram of a display system including an HMD 2001, a mobile terminal 2002, and a computer terminal 901 in the second embodiment. FIG. 19 is a diagram schematically showing a configuration of the HMD 2001 and the mobile terminal 2002 shown in FIG. 18. In FIG. 18 and FIG. 19, like elements as those in the first embodiment shown in FIG. 1 and FIG. 3 are designated by the same reference numerals. Further, in FIG. 19, the illustration of the configuration for the left eye portion of the HMD 2001 is omitted. In the following, the second embodiment is described mainly on the differences with respect to the first embodiment.

FIG. 18 and FIG. 19 show an example, in which the function of the control unit 105 is present in the HMD 2001 and in the mobile terminal 2002. In this example, for instance, the mobile terminal 2002 is a mobile terminal such as a mobile phone or a so-called smart phone. In FIG. 18 and FIG. 19, the function of the control unit 105 of the HMD 100 in the first embodiment is separated in a control unit 2003 in the display terminal 2001 and in a control unit 2004 in the mobile terminal 2002. The HMD 2001 and the mobile terminal 2002 in the second embodiment constitute the display terminal 905 (see FIG. 7).

The control unit 2003 in the HMD 2001 is provided with a CPU 11$b$ in place of the CPU 11 in the HMD 100 shown in FIG. 1, and is provided with a memory 12$b$ in place of the memory 12 in the HMD 100 shown in FIG. 1. The CPU 11$b$ includes, as functional blocks, a communication unit 2102, a display control unit 1103, and a diffraction pattern management unit 1104. A program is stored in the memory 12$b$. Further, data and the like are temporarily stored in the memory 12$b$. The CPU 11$b$ functions as the aforementioned functional blocks by executing the program stored in the memory 12$b$.

The control unit 2004 in the mobile terminal 2002 is provided with a CPU 2004$a$ and a memory 2004$b$. The CPU 2004$a$ includes, as functional blocks, a communication unit 2101, a diffraction pattern process unit 1101, and a correction pattern management unit 1102. A program is stored in the memory 2004$b$. Further, data and the like are temporarily stored in the memory 2004$b$. The CPU 2004$a$ functions as the aforementioned functional blocks by executing the program stored in the memory 2004$b$.

Among the functional blocks included in the control units 2003 and 2004, the functions of the diffraction pattern process unit 1101, the correction pattern management unit 1102, the display control unit 1103, and the diffraction pattern management unit 1104 are substantially the same as the corresponding ones in the first embodiment. In the second embodiment, the function of the communication unit 1105 in the first embodiment is divided into the two communication units 2101 and 2102.

In the second embodiment, unlike the first embodiment, communication between the diffraction pattern process unit 1101 and the display control unit 1103 is performed via the communication units 2101 and 2102. This makes it possible to distribute the function of the control unit 105 in the first embodiment to the two terminal devices 2001 and 2002. Further, when a contents acquisition request is transmitted from the display control unit 1103 to the computer terminal 901, the contents acquisition request is transmitted via the two communication units 2101 and 2102.

In this embodiment, communication between the communication units 2101 and 2102 is performed by near field communication. The method of near field communication is not specifically limited. As the near filed communication, it is possible to use communication standards such as Wi-Fi standards or Bluetooth (registered trademark).

Further, communication between the communication unit 2101 in the mobile terminal 2002 and the computer terminal 901 is performed via a communication network 900 e.g. the Internet. Means by which the communication unit 2101 is connected to the Internet is not specifically limited, but a method of utilizing a mobile phone communication network or a method of connecting to a public wireless LAN may be used. This eliminates the need for the communication unit 2102 in the HMD 2001 to connect to the communication network 900. Accordingly, as compared with the communication unit 1105 of the HMD 100 in the first embodiment, it becomes possible to suppress the electric power used by the communication unit 2102 in the HMD 2001. As a result, miniaturizing a battery 106 to be loaded in the HMD 2001 makes it possible to implement the lightweight HMD 2001.

Further, in the second embodiment, the diffraction pattern process unit 1101 is provided in the mobile terminal 2002. Accordingly, it is possible to reduce the computing capacity necessary for the CPU 11$b$ in the HMD 2001, as compared with the CPU 11 in the HMD 100. Thus, it is possible to implement the compact and lightweight HMD 2001.

In this embodiment, not in the HMD 2001 but in the mobile terminal 2002, the diffraction pattern process unit 1101 generates a combined diffraction pattern by correcting a basic diffraction pattern acquired from the computer terminal 901. Accordingly, the display control unit 1103 in the HMD 2001 displays a combined diffraction pattern suitable for the user on a spatial modulation element 103. As described above, a sequence of correcting a diffraction pattern in this embodiment is substantially the same as the processes of Steps 1301 through 1308 described in the first embodiment, except for a point that a contents acquisition request is issued from the display control unit 1103 to the computer terminal 901 via the two communication units 2101 and 2102, and a point that communication between the display control unit 1103 and the diffraction pattern processing 1101 is performed via the communication units 2101 and 2102. Therefore, the detailed description on the sequence is omitted herein.

In this embodiment, there is described an example, in which communication between the communication unit 2101 and the communication unit 2102 is performed by wireless communication. Alternatively, communication between the communication unit 2101 and the communication unit 2102 may be performed by wired communication by connecting between the HMD 2001 and the mobile terminal 2002 by a cable. As compared with the wireless communication, in the wired communication, it is possible to suppress electric power necessary for communication. Consequently, there is an advantageous effect that it becomes possible to utilize the display terminal 2001 and the mobile terminal 2002 for a long period of time.

Division of the functions included in the control unit 2003 of the HMD 2001 and in the control unit 2004 of the mobile terminal 2002 is not limited to the configuration shown in FIG. 18, but another division method may be employed. For instance, a configuration that a diffraction pattern management unit 1104 is provided in the mobile terminal 2002 may be adopted. In this case, there is an advantageous effect that the processing load in the HMD 2001 can be reduced, the capacity of the battery 106 can be reduced, and the weight of the HMD 2001 can be decreased.

In this embodiment, there is described an example, in which the combination of the HMD 2001 and the mobile terminal 2002 has a one-to-one correspondence. Alternatively, one mobile terminal 2002 may communicate with a plurality of HMDs 2001. In this case, there is an advantageous effect that the need of preparing a plurality of mobile terminals 2002 is eliminated, in the case where a plurality of users use HMDs 2001, respectively.

The mobile terminal 2002 may have a function other than the functions described in this embodiment. For instance, the mobile terminal 2002 may have the functions a mobile phone or a smart phone has, for instance, a communication function, a game function, a Web browsing function, and the like. Further, the control unit 2004 in the mobile terminal 2002 may be implemented by a dedicated circuit. Further alternatively, the control unit 2004 in the mobile terminal 2002 may be implemented as a software which runs on a mobile phone or a smart phone. In this case, it is easy to integrate the functions of a mobile phone or a smart phone with the function of correcting a diffraction pattern. Further, in the case where the function of the control unit 2004 in the mobile terminal 2002 is implemented by a software, it is possible to reduce the cost of the mobile terminal 2002.

As described above, in the second embodiment, the function of generating a combined diffraction pattern by correcting a basic diffraction pattern, and the function of displaying the combined diffraction pattern, are divided in a plurality of terminal devices. This makes it possible to reduce the number of parts necessary for the eyeglass-type HMD 2001, and to reduce the capacity of the battery 106. Accordingly, it is possible to implement the lighter and more easily-wearable eyeglass-type HMD 2001.

In the first embodiment, there is described a configuration, in which the computer terminal 901 is a server having a high computing capacity. Alternatively, for instance, as shown in FIG. 20 and FIG. 21, another configuration may be conceived.

Figure 20:
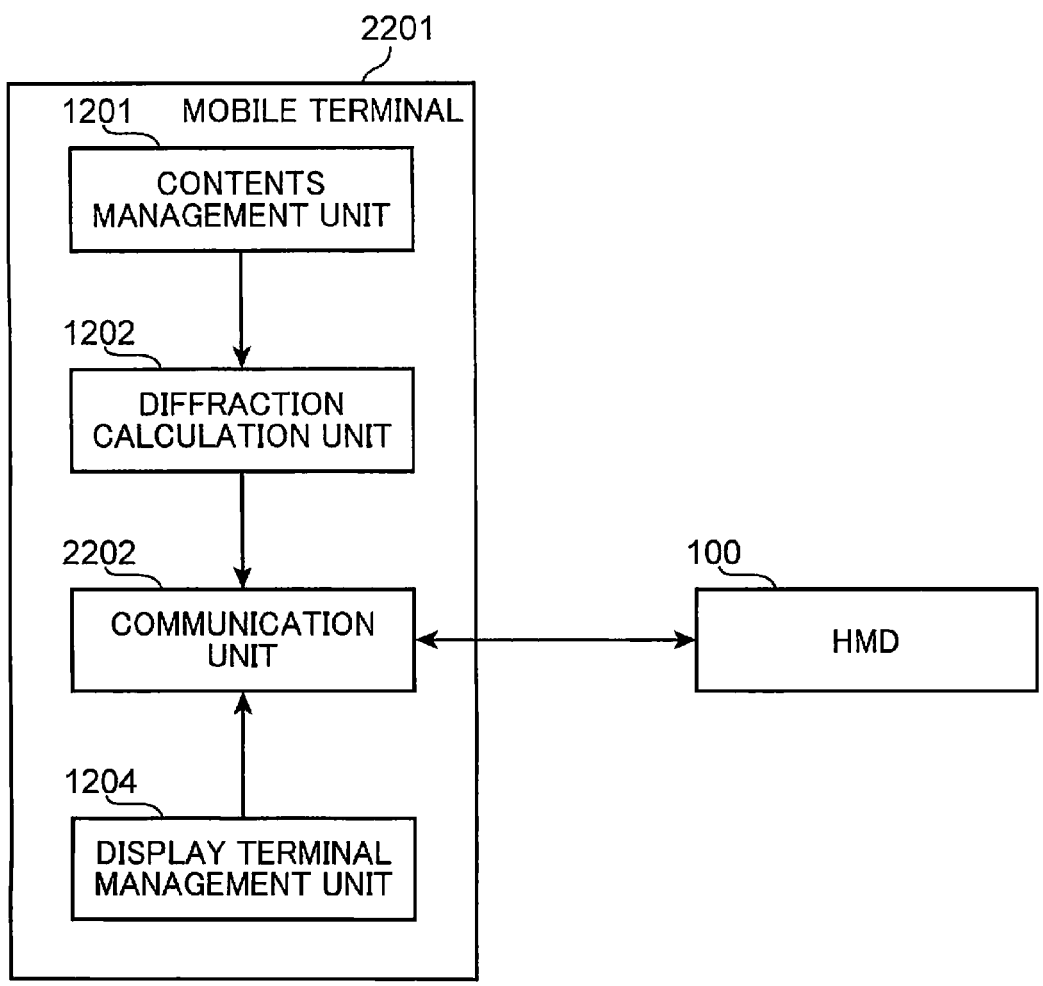
FIG. 20 is a diagram showing an example of a configuration, in which the function of a computer terminal is implemented by a mobile terminal.

FIG. 20 is a block diagram showing an example of a configuration, in which the function of the computer terminal 901 is implemented by a mobile terminal. In FIG. 20, like elements as those shown in FIG. 2 are designated by the same reference numerals. An HMD 100 in FIG. 20 is configured the same as the first embodiment shown in FIG. 1 and FIG. 3.

A display system shown in FIG. 20 is provided with a mobile terminal 2201 and the HMD 100. The mobile terminal 2201 is a mobile terminal such as a mobile phone or a smart phone. The mobile terminal 2201 is provided with a communication unit 2202 in place of the communication unit 1203 in the computer terminal 901 shown in FIG. 2. The communication unit 2202 performs communication with the communication unit 1105 (see FIG. 1) in the HMD 100 by near field communication or wired communication. Accordingly, it is possible to reduce the electric power necessary for communication in the communication unit 1105 (see FIG. 1) of the HMD 100. As a result, it becomes possible to use the HMD 100 for a long period of time.

Figure 21:
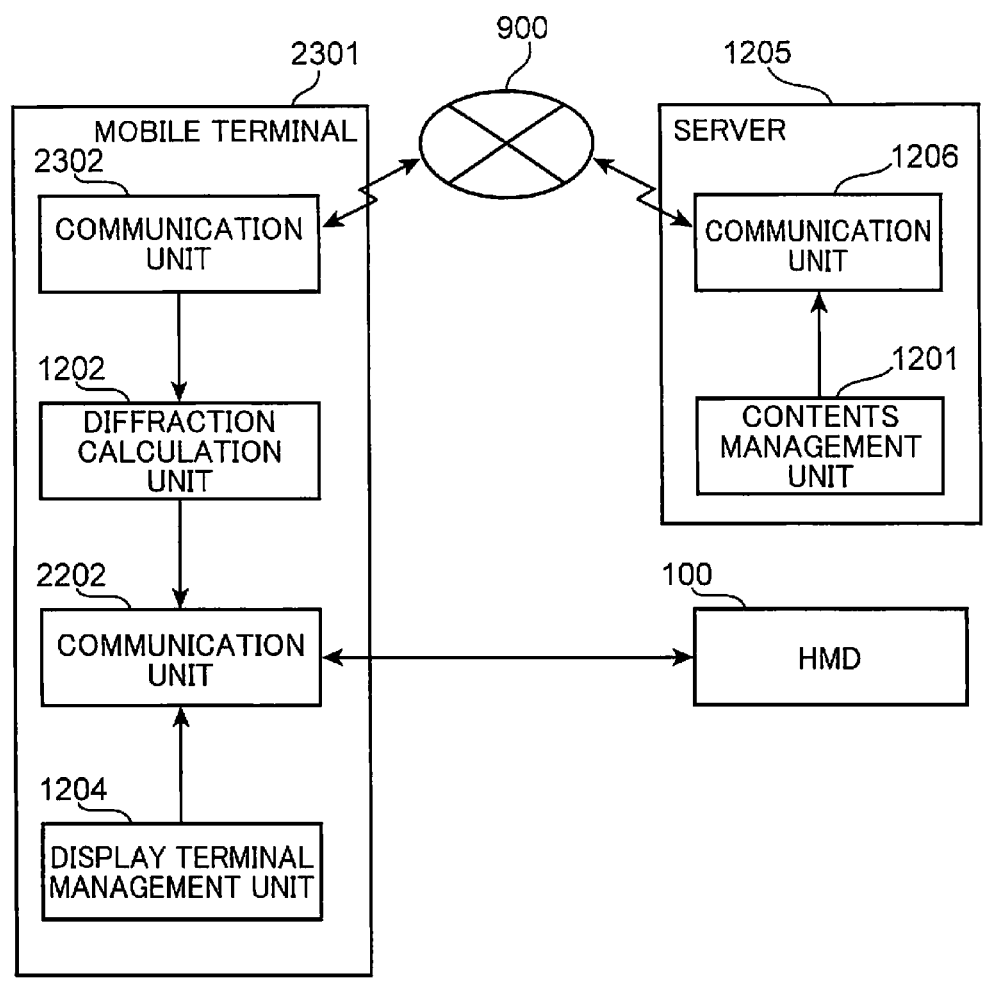
FIG. 21 is a diagram showing another example of a configuration, in which the function of a computer terminal is implemented by a mobile terminal.

FIG. 21 is a block diagram showing another example of the configuration, in which the function of the computer terminal 901 is implemented by a mobile terminal. In FIG. 21, like elements as those shown in FIG. 20 are designated by the same reference numerals. An HMD 100 shown in FIG. 21 is configured in the same manner as the first embodiment shown in FIG. 1 and FIG. 3.

A display system shown in FIG. 21 is provided with a mobile terminal 2301, the HMD 100, and a server 1205. The mobile terminal 2301 is a mobile terminal such as a mobile phone or a smart phone. The mobile terminal 2301 is provided with a communication unit 2302 in place of the contents management unit 1201 in the mobile terminal 2201 shown in FIG. 20. The server 1205 is provided with a contents management unit 1201 and a communication unit 1206. The communication unit 2302 in the mobile terminal 2301 is configured to be communicable with the communication unit 1206 in the server 1205 via a communication network 900 such as the Internet.

Upon receiving a contents acquisition request from the HMD 100 via the communication unit 2202, the mobile terminal 2301 transmits, to the server 1205, the received contents acquisition request via the communication unit 2302. In response to receiving the contents acquisition request from the communication unit 2302 in the mobile terminal 2301 via the communication unit 1206, the server 1205 transmits, to the mobile terminal 2301, display information acquired by the contents management unit 1201 via the communication unit 1206. The communication unit 2302 notifies a diffraction calculation unit 1202 of the received display information.

In the configuration shown in FIG. 21, the mobile terminal 2301 is not provided with a contents management unit 1201, but acquires, from the server 1205, display information corresponding to a contents acquisition request. Thus, it is possible to reduce the memory capacity required for the mobile terminal 2301.

Further, in the above first embodiment, the basic diffraction pattern 1601 shown in FIG. 13, the correction diffraction pattern 1701 shown in FIG. 14, and the combined diffraction pattern 1801 shown in FIG. 15 have substantially the same pixel number, but may have pixel numbers different from each other.

Figure 22:
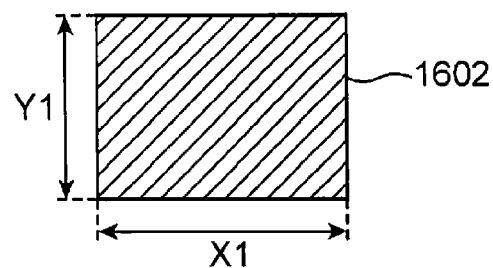
FIG. 22 is a diagram showing another example of the basic diffraction pattern.
Figure 23:
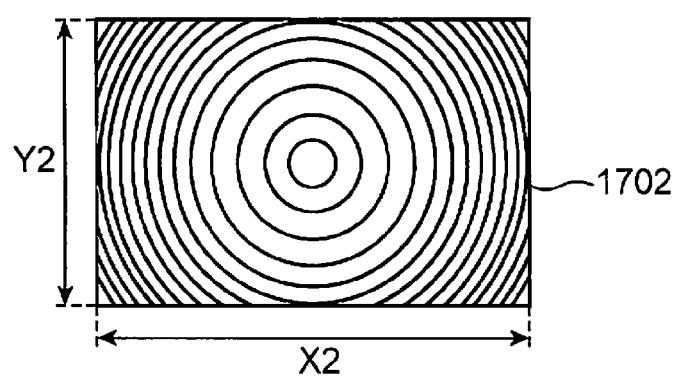
FIG. 23 is a diagram showing another example of the correction diffraction pattern.
Figure 24:
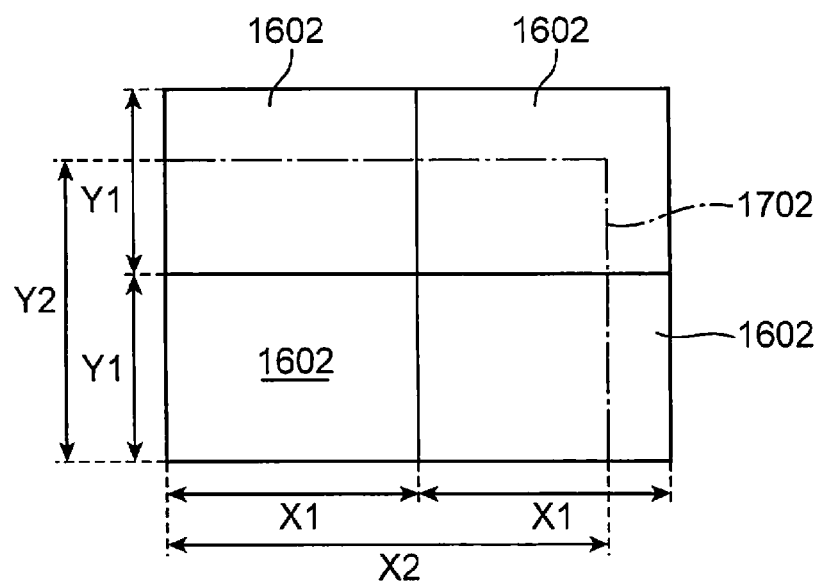
FIG. 24 is a schematic diagram describing an example of a combined diffraction pattern generation method.
Figure 25:
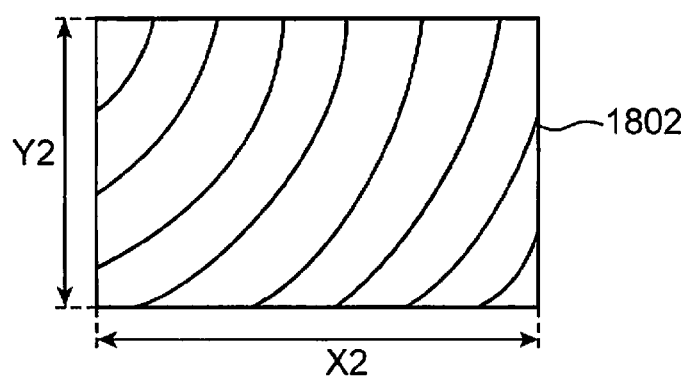
FIG. 25 is a diagram showing another example of the combined diffraction pattern.

FIG. 22 is a diagram showing another example of the basic diffraction pattern. FIG. 23 is a diagram showing another example of the correction diffraction pattern. FIG. 24 is a schematic diagram describing an example of a combined diffraction pattern generation method. FIG. 25 is a diagram showing an example of the combined diffraction pattern 1802 generated from the data shown in FIG. 22 and FIG. 23.

A basic diffraction pattern 1602 shown in FIG. 22 is generated by an inverse Fourier transform from an original image (e.g. the original image 401 shown in FIG. 26A) by the diffraction calculation unit 1202 (see e.g. FIG. 2). A correction diffraction pattern 1702 shown in FIG. 23 is held by the correction pattern management unit 1102 (see e.g. FIG. 1).

The basic diffraction pattern 1602 has a rectangular shape such that the pixel number in a horizontal direction is X1 (e.g. X1=512) and the pixel number in a vertical direction is Y1 (e.g. Y1=480). The correction diffraction pattern 1702 has a rectangular shape such that the pixel number in a horizontal direction is X2 (e.g. X2=1,366) and the pixel number in a vertical direction is Y2 (e.g. Y2=1,200). In this example, X1<x2 and Y1<Y2. Specifically, the pixel number of the basic diffraction pattern 1602 is smaller than the pixel number of the correction diffraction pattern 1702. It should be noted that the correction diffraction pattern 1702 and the combined diffraction pattern 1802 have the same pixel number.

The diffraction pattern process unit 1101 (see e.g. FIG. 1) generates a combined diffraction pattern 1802 shown in FIG. 25 with use of the basic diffraction pattern 1602 and the correction diffraction pattern 1702. At this time, as shown in FIG. 24, the diffraction pattern process unit 1101 arranges, in horizontal and vertical directions, the basic diffraction pattern 1602 by the number of sheets so that the total pixel number of the sheets of the basic diffraction pattern 1602 becomes equal to or larger than the pixel number of the correction diffraction pattern 1702 in the respective directions. In FIG. 24, two sheets of the basic diffraction pattern 1602 each in horizontal and vertical directions, namely, four sheets of the basic diffraction pattern 1602 in total are arranged.

The diffraction pattern process unit 1101 extracts, from the four sheets of the basic diffraction pattern 1602, an area corresponding to the correction diffraction pattern 1702, namely, an area corresponding to the pixel number X2 in a horizontal direction and the pixel number Y2 in a vertical direction. The diffraction pattern process unit 1101 generates a combined diffraction pattern 1802 with use of the extracted area of the basic diffraction pattern 1602, and the correction diffraction pattern 1702.

As described above, as shown in FIG. 24, the diffraction pattern process unit 1101 repeatedly uses data of the basic diffraction pattern 1602. With this, the diffraction pattern process unit 1101 can appropriately generate the combined diffraction pattern 1802, even when the pixel number of the basic diffraction pattern 1602 is smaller than the pixel number of the correction diffraction pattern 1702. In the configuration shown in FIGS. 22 through 25, the pixel number corresponds to an example of an information quantity.

In the configuration shown in FIGS. 22 through 25, the pixel number of the basic diffraction pattern 1602 is smaller than the pixel number of the correction diffraction pattern 1702. Accordingly, it is possible to reduce the computation load on the diffraction calculation unit 1202 of the computer terminal 901. Further, it is possible to shorten the time required for transmitting a basic diffraction pattern from the computer terminal 901 to the HMD 100. Further, in the case where the configuration shown in FIGS. 22 through 25 is applied to the configuration shown in FIGS. 20 and 21, it is possible to reduce the computation load on the diffraction calculation unit 1202 in the mobile terminals 2201, 2301. Further, it is possible to shorten the time required for transmitting a basic diffraction pattern from the mobile terminals 2201, 2301 to the HMD 100.

The pixel number in each of horizontal and vertical directions of the basic diffraction pattern 1602 may be a power of two (e.g. the value is 512), or may be a value other than the above. In the case where the pixel number is a power of two, it is possible to enhance the computing speed of an inverse Fourier transform. Further, the pixel numbers of the basic diffraction pattern 1602 in horizontal and vertical directions may be the same as each other, or may be different from each other.

Further, in the foregoing embodiments, the HMDs 100, 2001 have the shape of eyeglasses. The shapes of the HMDs 100, 2001 are not limited to the shape of eyeglasses. Further, the display terminal 905 is in the form of an HMD, but may be a display device other than a head-mounted display device.

The foregoing embodiments are merely an example, and various modifications may be applied, as far as such modifications do not depart from the gist of the invention.

The foregoing embodiments mainly include the invention having the following features.

A display device according to an aspect of the invention includes: a light source which outputs laser light; an illumination optical system which emits the laser light as illumination light; a spatial modulation element which diffracts the illumination light by displaying a diffraction pattern; a diffraction pattern acquiring unit which acquires a basic diffraction pattern generated based on an image; and a diffraction pattern process unit which uses the basic diffraction pattern and a correction diffraction pattern for correcting the basic diffraction pattern to generate, as the diffraction pattern to be displayed on the spatial modulation element, a combined diffraction pattern obtained by correcting the basic diffraction pattern by the correction diffraction pattern, wherein the spatial modulation element displays diffracted light, which is diffracted by displaying the combined diffraction pattern, to a user as a fictive image.

According to this configuration, laser light is outputted from the light source. The laser light is emitted from the illumination optical system as illumination light. A diffraction pattern is displayed on the spatial modulation element, whereby the illumination light is diffracted. A basic diffraction pattern generated based on an image is acquired by the diffraction pattern acquiring unit. The basic diffraction pattern and the correction diffraction pattern for correcting the basic diffraction pattern are used to generate, by the diffraction pattern process unit, a combined diffraction pattern, as the diffraction pattern to be displayed on the spatial modulation element, obtained by correcting the basic diffraction pattern by the correction diffraction pattern. Diffracted light, which is diffracted by the combined diffraction pattern being displayed on the spatial modulation element, is displayed to the user as a fictive image. Accordingly, it becomes possible to generate a combined diffraction pattern suitable for the device by correcting a basic diffraction pattern using a correction diffraction pattern. Further, since the device does not generate a basic diffraction pattern, it is possible to reduce the computation load on the device by the computation amount required for generation of the basic diffraction pattern, for instance.

Further, in the above display device, the diffraction pattern acquiring unit may acquire the basic diffraction pattern, which is generated by an external computer terminal, via communication.

According to this configuration, the basic diffraction pattern generated by the external computer terminal is acquired by the diffraction pattern acquiring unit via communication. Accordingly, it is possible to reduce the computation load on the device. As a result, it is possible to reduce the size and the weight of the device.

Further, in the above display device, the correction diffraction pattern may be configured to differentiate a position of the fictive image, which is to be displayed when the combined diffraction pattern is displayed on the spatial modulation element, from a position of the fictive image, which is to be displayed when the basic diffraction pattern is displayed on the spatial modulation element.

According to this configuration, the position of the fictive image to be displayed in displaying the combined diffraction pattern on the spatial modulation element is differentiated from the position of the fictive image to be displayed in displaying the basic diffraction pattern on the spatial modulation element. The above configuration makes it easy to adjust the display position of the fictive image by the correction diffraction pattern.

Further, in the above display device, the correction diffraction pattern may be configured to display the fictive image at a position according to an eyesight of the user when the combined diffraction pattern is displayed on the spatial modulation element. Alternatively, the fictive image may be displayed at a position at which the eyeball of the user can focus, in place of the position according to the user's eyesight.

According to this configuration, the fictive image is displayed at a position according to the user's eyesight by the correction diffraction pattern when the combined diffraction pattern is displayed on the spatial modulation element. Accordingly, it becomes possible to display the fictive image at a position easily seen by the user according to the eyesight of the user using the display device.

Further, in the above display device, the correction diffraction pattern may include a first correction diffraction pattern which is configured to match the eyesight of a right eye of the user, and a second correction diffraction pattern which is configured to match the eyesight of a left eye of the user, the diffraction pattern process unit: may use the basic diffraction pattern and the first correction diffraction pattern to generate, as the combined diffraction pattern, a first combined diffraction pattern for displaying the fictive image at a position according to the eyesight of the right eye of the user; and may use the basic diffraction pattern and the second correction diffraction pattern to generate, as the combined diffraction pattern, a second combined diffraction pattern for displaying the fictive image at a position according to the eyesight of the left eye of the user, the spatial modulation element may include a first spatial modulation element on which the first combined diffraction pattern is displayed, and a second spatial modulation element on which the second combined diffraction pattern is displayed, the first spatial modulation element may display diffracted light, which is diffracted by displaying the first combined diffraction pattern, to the right eye of the user as the fictive image, and the second spatial modulation element may display diffracted light, which is diffracted by displaying the second combined diffraction pattern, to the left eye of the user as the fictive image.

According to this configuration, the first correction diffraction pattern is configured to match the eyesight of the right eye of the user. The second correction diffraction pattern is configured to match the eyesight of the left eye of the user. The basic diffraction pattern and the first correction diffraction pattern are used to generate, as the combined diffraction pattern, the first combined diffraction pattern for displaying the fictive image at a position according to the eyesight of the right eye of the user. Further, the basic diffraction pattern and the second correction diffraction pattern are used to generate, as the combined diffraction pattern, the second combined diffraction pattern for displaying the fictive image at a position according to the eyesight of the left eye of the user. Diffracted light, which is diffracted by the first combined diffraction pattern displayed on the first spatial modulation element, is displayed as the fictive image to the right eye of the user. Diffracted light, which is diffracted by the second combined diffraction pattern displayed on the second spatial modulation element, is displayed as the fictive image to the left eye of the user. Accordingly, it becomes possible to adjust the display position of the fictive image with respect to the left and right eyes, according to an eyesight difference between the left and right eyes of the user.

Further, in the above display device, the correction diffraction pattern may be a phase pattern to be obtained in a case where light from a point light source, which is virtually disposed at a position at which an eyeball of the user can focus, is incident on the spatial modulation element.

According to this configuration, the correction diffraction pattern is a phase pattern to be obtained in a case where light from a point light source, which is virtually disposed at a position at which an eyeball of the user can focus, is incident on the spatial modulation element. Thus, it becomes possible to display the fictive image at a position suitable for the user's eyesight.

Further, in the above display device, the correction diffraction pattern may be a phase pattern which corrects aberration of the illumination optical system when the combined diffraction pattern is displayed on the spatial modulation element.

According to this configuration, the correction diffraction pattern is a phase pattern which corrects aberration of the illumination optical system when the combined diffraction pattern is displayed on the spatial modulation element. Accordingly, it becomes possible to reduce aberration of the illumination optical system, thereby displaying a fictive image of enhanced quality to the user.

Further, in the above display device, the device may further include an optical component which is disposed on an optical path from the light source to an eyeball of the user, wherein the correction diffraction pattern may be a phase pattern which corrects aberration of the optical component when the combined diffraction pattern is displayed on the spatial modulation element.

According to this configuration, the optical component is disposed on the optical path from the light source to the eyeball of the user. The correction diffraction pattern is a phase pattern which corrects aberration of the optical component when the combined diffraction pattern is displayed on the spatial modulation element. Accordingly, it becomes possible to reduce aberration of the optical component, thereby displaying a fictive image of enhanced quality to the user.

Further, in the above display device, the device may further include a mounting portion to be mounted on a head portion of the user, wherein the spatial modulation element may display the diffracted light to the user as the fictive image in a state that the mounting portion is mounted on the head portion of the user.

According to this configuration, diffracted light is displayed to the user as the fictive image by the spatial modulation element in a state that the mounting portion is mounted on the head portion of the user. Thus, it is possible to appropriately implement a head-mounted display device.

Further, in the above display device, an information quantity of the basic diffraction pattern may be smaller than an information quantity of the correction diffraction pattern.

According to this configuration, the information quantity of the basic diffraction pattern is smaller than the information quantity of the correction diffraction pattern. Thus, it is possible to shorten the time required for communication of the basic diffraction pattern for instance, is possible to reduce the computation load required for generating the basic diffraction pattern for instance, and is possible to reduce a recording capacity required for holding the basic diffraction pattern for instance, as compared with a case, in which the information quantity of the basic diffraction pattern is the same as the information quantity of the correction diffraction pattern.

A display system according to an aspect of the invention includes: a display terminal which is constituted of the aforementioned display device; and a computer terminal which is configured to be communicable with the display terminal, wherein the computer terminal generates the basic diffraction pattern, and transmits the generated basic diffraction pattern to the display terminal, and the diffraction pattern acquiring unit receives to acquire the basic diffraction pattern transmitted from the computer terminal.

According to this configuration, the basic diffraction pattern is generated by the computer terminal, and the generated basic diffraction pattern is transmitted to the display terminal. The basic diffraction pattern transmitted from the computer terminal is received and acquired by the diffraction pattern acquiring unit in the display terminal. Accordingly, it becomes possible to generate a combined diffraction pattern suitable for the display terminal by the correction diffraction pattern. Further, since the basic diffraction pattern is generated by the computer terminal. Thus, it becomes possible to reduce the computation load on the display terminal.

Further, in the above display system, the system may include, as the display terminal, a first display terminal and a second display terminal, wherein the computer terminal may transmit the identical basic diffraction pattern to the first display terminal and the second display terminal, respectively, and the correction diffraction pattern used in the first display terminal, and the correction diffraction pattern used in the second display terminal may be different from each other.

According to this configuration, the identical basic diffraction pattern is transmitted to the first display terminal and the second display terminal, respectively, by the computer terminal. The correction diffraction pattern used in the first display terminal, and the correction diffraction pattern used in the second display terminal are different from each other. Accordingly, it becomes possible to display the fictive images by the combined diffraction patterns different from each other to the users using the first display terminal and the second display terminal, while reducing the computation load on the computer terminal which generates the basic diffraction pattern for the first display terminal and the second display terminal.

Further, in the above display system, the computer terminal may be a server which is configured to be communicable with the display terminal via a communication network, the display terminal may further include a mounting portion to be mounted on a head portion of the user, and the spatial modulation element may display the diffracted light to the user as the fictive image in a state that the mounting portion is mounted on the head portion of the user.

According to this configuration, a basic diffraction pattern generated by the server is transmitted to the display terminal via the communication network. The diffraction pattern acquiring unit of the display terminal receives to acquire the basic diffraction pattern transmitted from the server via the communication network. Diffracted light is displayed to the user as the fictive image by the spatial modulation element in a state that the mounting portion is mounted on the head portion of the user. Thus, since the basic diffraction pattern is generated by the server, it is possible to reduce the computation load required in the display terminal to be worn by the user. As a result, it becomes possible to implement a compact and lightweight head-mounted display terminal.

Further, in the above display system, the computer terminal may be a mobile terminal which is configured to be communicable with the display terminal via near field communication, the display terminal may further include a mounting portion to be mounted on a head portion of the user, and the spatial modulation element may display the diffracted light to the user as the fictive image in a state that the mounting portion is mounted on the head portion of the user.

According to this configuration, the computer terminal is a mobile terminal which is configured to be communicable with the display terminal via near field communication. The diffracted light is displayed to the user as the fictive image by the spatial modulation element in a state that the mounting portion is mounted on the head portion of the user. Accordingly, it is possible to reduce the computation load required in the display terminal to be worn by the user. Further, the display terminal communicates with the mobile terminal via near field communication. Thus, it is possible to reduce the electric power required for communication, as compared with a case where communication is performed via a communication network, for instance. As a result, it becomes possible to implement a compact and lightweight head-mounted display terminal.

Further, in the above display system, the computer terminal may be a mobile terminal which is configured to be communicable with the display terminal via near field communication, the display terminal: may include, as the light source, a first light source for a right eye of the user, and a second light source for a left eye of the user; may include, as the illumination optical system, a first illumination optical system for the right eye of the user, and a second illumination optical system for the left eye of the user; and may include, as the spatial modulation element, a first spatial modulation element for the right eye of the user, and a second spatial modulation element for the left eye of the user, the diffraction pattern process unit may generate, as the combined diffraction pattern, a first combined diffraction pattern to be displayed on the first spatial modulation element, and a second combined diffraction pattern to be displayed on the second spatial modulation element, the first spatial modulation element may display diffracted light, which is diffracted by displaying the first combined diffraction pattern, to the right eye of the user as the fictive image, and the second spatial modulation element may display diffracted light, which is diffracted by displaying the second combined diffraction pattern, to the left eye of the user as the fictive image.

According to this configuration, laser light outputted from the first light source is emitted from the first illumination optical system as illumination light, and the illumination light is diffracted by displaying a diffraction pattern on the first spatial modulation element. Laser light outputted from the second light source is emitted from the second illumination optical system as illumination light, and the illumination light is diffracted by displaying a diffraction pattern on the second spatial modulation element. The first combined diffraction pattern to be displayed on the first spatial modulation element, and the second combined diffraction pattern to be displayed on the second spatial modulation element are generated by the diffraction pattern process unit, as the combined diffraction pattern. Diffracted light, which is diffracted by displaying the first combined diffraction pattern on the first spatial modulation element, is displayed to the right eye of the user as the fictive image. Diffracted light, which is diffracted by displaying the second combined diffraction pattern on the second spatial modulation element, is displayed to the left eye of the user as the fictive image. Accordingly, it is possible to appropriately display the fictive image on the right and left eyes of the user, while suppressing an increase in the computation load on the mobile terminal. Further, the display terminal communicates with the mobile terminal via near field communication. Thus, it is possible to reduce the electric power required for communication, as compared with a case where communication is performed via a communication network, for instance.

INDUSTRIAL APPLICABILITY

The display device and the display system according to the invention are useful as a display device and a display system such as an HMD which is configured to be provided with a spatial modulation element which diffracts laser illumination light by displaying a diffraction pattern at a position near the user's eyeball, and is configured that diffracted light from the spatial modulation element reaches a predicted eyeball position. Further, the display device and the display system are also applicable to a use application such as a display method or a display device designing method.

The invention claimed is:

1. A display device which displays an original image to a user of the display device, the display device comprising:
    a light source which outputs laser light;
    an illumination optical system which emits the laser light as illumination light;
    a spatial modulation element which is illuminated by the illumination light, and diffracts the illumination light by displaying a diffraction pattern;
    a diffraction pattern acquiring unit which acquires a planar basic diffraction pattern, the planar basic diffraction pattern being different from the original image and being generated by performing calculation for each pixel value of the original image; and
    a diffraction pattern process unit which uses the planar basic diffraction pattern and a planar correction diffraction pattern for correcting the planar basic diffraction pattern to generate, as the diffraction pattern to be displayed on the spatial modulation element, a planar combined diffraction pattern obtained by overlapping the planar correction diffraction pattern on the planar basic diffraction pattern, wherein
    the spatial modulation element displays the planar combined diffraction pattern to diffract the illumination light to generate diffracted light, which is directed to a location of an eye of the user to create a fictive image, the planar combined diffraction pattern being generated to cause the fictive image to appear as the original image at a distance from the user.

2. The display device according to claim 1, wherein
    the diffraction pattern acquiring unit acquires the planar basic diffraction pattern, which is generated by an external computer terminal, via communication, the external computer terminal performing calculation for each pixel value of the original image to generate the planar basic diffraction pattern.

3. The display device according to claim 1, wherein
    the planar correction diffraction pattern is configured to differentiate a distance from the user of the fictive image, which is to appear when the planar combined diffraction pattern is displayed on the spatial modulation element, from a distance from the user of the fictive image, which is to appear when the planar basic diffraction pattern is displayed on the spatial modulation element.

4. The display device according to claim 3, wherein
    the planar correction diffraction pattern is configured to cause the fictive image to appear at a distance from the user according to an eyesight of the user when the planar combined diffraction pattern is displayed on the spatial modulation element.

5. The display device according to claim 4, wherein
    the planar correction diffraction pattern includes a first planar correction diffraction pattern which is configured to match the eyesight of a right eye of the user, and a second planar correction diffraction pattern which is configured to match the eyesight of a left eye of the user,
    the diffraction pattern process unit:
        uses the planar basic diffraction pattern and the first planar correction diffraction pattern to generate, as the planar combined diffraction pattern, a first planar combined diffraction pattern for causing the fictive image to appear at a distance from the user according to the eyesight of the right eye of the user; and
        uses the planar basic diffraction pattern and the second planar correction diffraction pattern to generate, as the planar combined diffraction pattern, a second planar combined diffraction pattern for causing the fictive image to appear at a distance from the user according to the eyesight of the left eye of the user,
    the spatial modulation element includes a first spatial modulation element on which the first planar combined diffraction pattern is displayed, and a second spatial modulation element on which the second planar combined diffraction pattern is displayed,
    the first spatial modulation element displays the first planar combined diffraction pattern to diffract the illumination light to generate diffracted light, which is directed to a location of the right eye of the user to create the fictive image, and
    the second spatial modulation element displays the second planar combined diffraction pattern to diffract the illumination light to generate diffracted light, which is directed to a location of the left eye of the user to create the fictive image.

6. The display device according to claim 4, wherein
    the planar correction diffraction pattern is a phase pattern to be obtained in a case where light from a point light source, which is virtually disposed at a position at which an eyeball of the user can focus, is incident on the spatial modulation element.

7. The display device according to claim 1, wherein
    the planar correction diffraction pattern is a phase pattern which corrects aberration of the illumination optical system when the planar combined diffraction pattern is displayed on the spatial modulation element.

8. The display device according to claim 1, further comprising an optical component which is disposed on an optical path from the light source to an eyeball of the user, wherein the planar correction diffraction pattern is a phase pattern which corrects aberration of the optical component when the planar combined diffraction pattern is displayed on the spatial modulation element.

9. The display device according to claim 1, further comprising a mounting portion to be mounted on a head portion of the user, wherein the spatial modulation element displays the planar combined diffraction pattern to diffract the illumination light to generate the diffracted light which is directed to a location of an eye of the user to create the fictive image in a state that the mounting portion is mounted on the head portion of the user.

10. The display device according to claim 1, wherein an information quantity of the planar basic diffraction pattern is smaller than an information quantity of the planar correction diffraction pattern.

11. A display system, comprising:

a display terminal which is constituted of the display device according to claim 1; and a computer terminal which is configured to be communicable with the display terminal, wherein the computer terminal performs calculation for each pixel value of the original image to generate the planar basic diffraction pattern, and transmits the generated basic diffraction pattern to the display terminal, and the diffraction pattern acquiring unit receives to acquire the planar basic diffraction pattern transmitted from the computer terminal.

12. The display system according to claim 11, comprising, as the display terminal, a first display terminal and a second display terminal, wherein the computer terminal transmits the identical basic diffraction pattern to the first display terminal and the second display terminal, respectively, and the planar correction diffraction pattern used in the first display terminal, and the planar correction diffraction pattern used in the second display terminal are different from each other.

13. The display system according to claim 11, wherein the computer terminal is a server which is configured to be communicable with the display terminal via a communication network, the display terminal further includes a mounting portion to be mounted on a head portion of the user, and the spatial modulation element displays the planar combined diffraction pattern to diffract the illumination light to generate the diffracted light which is directed to a location of an eye of the user to create the fictive image in a state that the mounting portion is mounted on the head portion of the user.

14. The display system according to claim 11, wherein the computer terminal is a mobile terminal which is configured to be communicable with the display terminal via near field communication, the display terminal further includes a mounting portion to be mounted on a head portion of the user, and the spatial modulation element displays the planar combined diffraction pattern to diffract the illumination light to generate the diffracted light which is directed to a location of an eye of the user to create the fictive image in a state that the mounting portion is mounted on the head portion of the user.

15. The display system according to claim 11, wherein the computer terminal is a mobile terminal which is configured to be communicable with the display terminal via near field communication, the display terminal:
  includes, as the light source, a first light source for a right eye of the user, and a second light source for a left eye of the user;
  includes, as the illumination optical system, a first illumination optical system for the right eye of the user, and a second illumination optical system for the left eye of the user; and
  includes, as the spatial modulation element, a first spatial modulation element for the right eye of the user, and a second spatial modulation element for the left eye of the user, the diffraction pattern processor generates, as the planar combined diffraction pattern, a first planar combined diffraction pattern to be displayed on the first spatial modulation element, and a second planar combined diffraction pattern to be displayed on the second spatial modulation element, the first spatial modulation element displays the first planar combined diffraction pattern to diffract the illumination light to generate diffracted light, which is directed to a location of the right eye of the user to create the fictive image, and the second spatial modulation element displays the second planar combined diffraction pattern to diffract the illumination light to generate diffracted light, which is directed to a location of the left eye of the user to create the fictive image.

* * * * *